United States Patent [19]

Shirai et al.

[11] Patent Number: 5,758,943
[45] Date of Patent: *Jun. 2, 1998

[54] HEADLAMP FOR USE IN A VEHICLE

[75] Inventors: Katutada Shirai; Hironori Tsukamoto, both of Shizuoka, Japan

[73] Assignee: Koito Manufacturing Co., Ltd., Tokyo, Japan

[*] Notice: The term of this patent shall not extend beyond the expiration date of Pat. No. 5,660,455.

[21] Appl. No.: 514,140

[22] Filed: Aug. 11, 1995

[30] Foreign Application Priority Data

Aug. 15, 1994 [JP] Japan ................................. 6-191380
May 17, 1995 [JP] Japan ................................. 7-118375

[51] Int. Cl.⁶ .................................................. B60Q 1/04
[52] U.S. Cl. .................... 362/66; 362/61; 362/428; 362/289; 33/288
[58] Field of Search .................... 362/66, 69, 70, 362/427, 428, 289; 33/288, 370; 116/282

[56] References Cited

U.S. PATENT DOCUMENTS

| | | | |
|---|---|---|---|
| 4,916,583 | 4/1990 | Nagasawa | 362/61 |
| 5,029,051 | 7/1991 | Shirai et al. | 362/66 |
| 5,032,964 | 7/1991 | Endo et al. | 362/61 |
| 5,055,980 | 10/1991 | Mochizuki | 362/66 |
| 5,063,480 | 11/1991 | McMahan et al. | 362/66 |
| 5,065,293 | 11/1991 | Mochizuki | 362/273 |
| 5,067,052 | 11/1991 | Suzuki et al. | 362/61 |
| 5,067,056 | 11/1991 | Suzuki et al. | 362/66 |
| 5,068,769 | 11/1991 | Umeda et al. | 33/288 |
| 5,077,642 | 12/1991 | Lisak | 362/66 |
| 5,083,244 | 1/1992 | Shirai et al. | 362/61 |
| 5,090,395 | 2/1992 | Gannon | 116/282 |
| 5,111,369 | 5/1992 | Shirai et al. | 362/61 |
| 5,121,303 | 6/1992 | Shirai et al. | 362/61 |
| 5,150,958 | 9/1992 | Miyazawa et al. | 362/66 |
| 5,228,768 | 7/1993 | Suzuki | 362/66 |
| 5,337,222 | 8/1994 | Shirai et al. | 362/66 |
| 5,381,313 | 1/1995 | Choji | 362/66 |
| 5,546,283 | 8/1996 | Ohtsuka et al. | 362/66 |

*Primary Examiner*—Thomas M. Sember
*Attorney, Agent, or Firm*—Sughrue, Mion, Zinn, Macpeak & Seas, PLLC

[57] ABSTRACT

The headlamp is structured such that a reflector 4 is supported within a lamp body 2 so as to be inclinable with respect to the lamp body 2 and, by rotatively operating an aiming screw 20 which extends through and forwardly of the lamp body 2 and is supported rotatable in the extend-through portion thereof, the reflector 4 is inclined right and left with respect to the lamp body 2 by an amount equivalent to the amount of rotation of the aiming screw 20 to thereby be able to adjusted the right and left illumination angle of the headlamp. In the headlamp, there is formed in the aiming screw 20 a male screw portion 20a which extends out backwardly of the lamp body 2, there is provided in the lamp body 2 a guide element 60 which extends in parallel to the male screw portion 20a, between the male screw portion 20a and guide element 30, there is disposed an inclination measuring device including a nut element 50 which is threadedly engageable with the male screw portion 20a and is advanceable and retreatable along the guide element 60 in linking with the rotation of the aiming screw 20, a cursor 74 provided in the nut element 50, and a linear scale 63 provided in the guide element 60, and there is formed in the root position of the male screw portion 20a a crown gear 23 which is engageable with the tip edge $D_1$ of a driver D inserted from a direction at right angles to the aiming screw 20, thereby facilitating the rotative operation of the aiming screw 20.

13 Claims, 15 Drawing Sheets

PRIOR ART

PRIOR ART

HEADLAMP FOR USE IN A VEHICLE

BACKGROUND OF THE INVENTION

The present invention relates to a headlamp for use in a vehicle including a measuring device for checking whether the right and left irradiation direction of a lamp, that is, the right and left illumination angles of a lamp are at desired positions or not and. More particularly, the invention relates to a headlamp for use in a vehicle which is able to adjust the lamp illumination angles to the desired positions easily if the right and left illumination angles of the lamp are not at the normal positions.

As an example of a headlamp for use in a vehicle, description will be given here of a headlamp of a movable reflector type that a reflector is inclinably supported within a lamp body. As shown in FIG. 26, the back surface side of a reflector 202 is supported at three points, that is, two aiming screw 203, 204 respectively extending back and forth and a fulcrum swinging 205 with respect to a lamp body 201. In FIG. 26, the reflector 202 is viewed from the front side thereof, while the aiming screws 203 and 204 respectively extend in a direction perpendicular to the surface of the present drawing. The aiming screws 203 and 204 are rotatably supported on the back surface wall of the lamp body 201, and the support points of the reflector 202 where the reflector 202 is supported by the aiming screws 203 and 204 are set, for example, at right angles to the oscillation point 205 when viewed from the front surface of the lamp. And, by rotating the aiming screws 203 and 204, the reflector 202 is inclined about a horizonal axis Lx and a vertical shaft Ly respectively, thereby being able to adjust the angle of irradiation of the lamp. In FIG. 26, reference character 206 designates a bulb acting as a light source which is mounted in the reflector 202.

An inclination measuring device employed in the above conventional headlamp, for example, as shown in FIG. 27, includes a guide element 212 fixed to the back surface wall of the lamp body 201 and extending in parallel to the aiming screw 203, a nut element 214 threadedly engageable with a male screw portion 203b extending backwardly of the aiming screw 203, a slide case 215 slidably assembled to the nut element 214 and guide element 212, a reference point 216 and a linear scale 217 respectively set between the guide element 212 and slide case 215, and a zero point adjusting screw 218 engageable with a round hole 215a formed in the slide case 215 and threadedly engageable with a female screw portion 214a formed in the nut element 214 for sliding the nut element 214 back and forth with respect to the slide case 215.

And, as shown in FIGS. 28 and 29, there has been also proposed an inclination measuring device having a simple structure as disclosed in Unexamined Japanese Patent Application No. Hei. 5-290604, which comprises a U-shaped nut element 214 threadedly engageable with the aiming screw 203 and opened in one side surface thereof, a zero point adjusting plate 218 mountable integrally with the nut element 214 and engageable with and slidable along the guide element 212, and a cursor 218a and a scale 217 respectively formed between the plate 218 and guide element 212.

To adjust the right and left illumination angles of the headlamp, as shown in FIGS. 27 and 28, a driver D may be engaged with the rear end engaging portion 203a of the aiming screw 203 from the back surface side of the lamp body 201, and then the driver D (that is, the aiming screw 203) may be rotated on until, in the inclination measuring device shown in FIG. 27, the reference point 216 becomes coincident with the zero point of the scale 217 and, in the inclination measuring device shown in FIG. 28, the cursor 218a becomes coincident with the zero point of the scale 217.

However, in the above-mentioned conventional headlamp, since the engaging portion 203a for engagement with the driver D used to drive the aiming screw 203 is provided in the rear end portion of the aiming screw 203, to rotate the aiming screw 203, an operator must look into the back surface side of the headlamp from the front end portion of the vehicle and further must operate the driver D such that the tip edge of the driver D faces the engaging portion 203a, that is, the operator is forced to take an unnatural attitude. This makes it impossible for the operator to perform the smooth rotational operation of the aiming screw (adjustment of the angles of irradiation of the headlamp).

Also, there is a possibility that, during the rotational operation of the driver D, the aiming screw 203 can be pushed up and thus can be oscillated vertically and horizontally so that the aiming screw bearing portion of the lamp body 201 can be worn and get loose. And, to rotate the aiming screw 203 smoothly, the driver D must be rotated while it is maintained coaxially with the aiming screw 203. However, because the operator must take an unnatural position to rotate the driver D, the tip edge of the drive D can be disengaged from the engaging portion 203a and thus can be abutted against the nut element 214 and guide element 212 to thereby damage them.

Further, in the conventional inclination measuring device, since there is employed a structure that the nut element 214 can be moved back and forth along the male screw portion 203b of the aiming screw 203 extending backwardly of the lamp body, the extended male screw portion 203b of the aiming screw 203 projects greatly backwardly of the lamp body and thus the back-and-forth dimension of the headlamp is large, which provides a severe condition in mounting the headlamp on the body of the vehicle.

SUMMARY OF THE INVENTION

The invention aims at eliminating the drawbacks found in the above-mentioned conventional headlamps for use in a vehicle. Accordingly, it is a first object of the invention to provide a headlamp for use in a vehicle which allows an aiming screw to be rotated by use of a driver extended (inserted) from one of the side portions (that is, the top, bottom, right and left sides) of the headlamp at right angles to the extending direction of the aiming screw to thereby facilitate the rotational operation of the aiming screw and also prevent the components of an inclination measuring device from being damaged during the rotational operation of the aiming screw.

It is a second object of the invention to provide a headlamp for use in a vehicle in which a male screw portion formed integral with the rear end portion of an aiming screw is divided from the aiming screw and is disposed along a reference element to thereby be able to reduce the back-and-forth dimension of the headlamp.

In attaining the above object, according to the invention, there is provided a headlamp for use in a vehicle, in which an inclinable element having a light reflecting surface for setting the irradiation direction of a lamp is supported inclinably with respect to a reference element, and an aiming screw extending through and forwardly of the reference element and borne rotatably in the extend-through portion thereof is rotatively operated to incline the inclinable element right and left with respect to the reference element by an angle corresponding to the amount of rotation of the aiming screw, thereby being able to adjust the right and left illumination angles of the headlamp, characterized in that the aiming screw includes a male screw portion extending backwardly of the reference element; the reference element includes a guide element extending in parallel to the male screw portion of the aiming screw; and, between the male screw portion and guide element, there is interposed an inclination measuring device comprising a nut element not only threadedly engageable with the male screw portion and contacted with the guide element in a rotation preventive manner but also advanceable and retreatable along the guide element in linking with the rotational movement of the aiming screw, and a relative scale formed between the nut element and the guide element, for measuring the right and left inclination of the inclinable element; and, at the root position of the male screw portion of the aiming screw, there is formed a crown gear engageable with the tip edge of a driver inserted from a direction at right angles to the extending direction of the aiming screw.

According to another aspect of the invention, there is provided a headlamp for use in a vehicle, in which an inclinable element having a light reflecting surface for setting the irradiation direction of a lamp is supported inclinably with respect to a reference element, and an aiming screw extending through and forwardly of the reference element and borne rotatably in the extend-through portion thereof is rotatively operated to incline the inclinable element right and left with respect to the reference element by an angle corresponding to the amount of rotation of the aiming screw, thereby being able to adjusted the right and left illumination angles of the headlamp, characterized in that in the reference element, there are provided a driven shaft including a male screw portion and rotatable in such a manner that it extends from the position of the reference element adjacent to the projecting portion of the aiming screw extending backwardly of the reference element along the reference element in a direction at substantially right angles to the extending direction of the aiming screw, and a guide element extending in parallel to the male screw portion of the driven shaft; between the projecting portion of the aiming screw extending backwardly of the reference element and the driven shaft, there is interposed a right angle change gear mechanism for rotating the driven gear and the aiming screw in linking with each other; between the male screw portion of the driven shaft and the guide element, there is provided an inclination measuring device comprising a nut element not only threadedly engageable with the male screw portion and contactable with the guide element in a rotation preventive manner but also advanceable and retreatable along the guide element in linking with the rotational movement of the aiming screw, and a relative scale formed between the nut element and the guide element, for measuring the right and left inclination of the inclinable element; and, at the root position of the projecting portion of the aiming screw extending backwardly of the reference element, there is formed a crown gear engageable with the tip edge of a driver inserted from a direction extending at right angles to the extending direction of the aiming screw.

If the aiming screw is rotated, then the inclinable element is inclined right and left with respect to the reference element (the driven shaft is rotated in linking with the rotational movement of the aiming screw), and the nut element advances and retreats along the backwardly extending male screw portion of the aiming screw (along the male screw portion of the driven shaft). The amount of right and left inclination of the inclinable element with respect to the reference element due to the rotation of the aiming screw is in proportion to the amount of rotation of the aiming screw and the amount of movement of the nut element along the guide element is also in proportion to the amount of rotation of the aiming screw, so that the amount of right and left shifting of the illumination angle of the headlamp appears as variations in the scale between the nut element and guide element. Therefore, it is possible to know from the variations in the scale whether the right and left illumination angle of the headlamp is proper or not and, if not proper, the amount of shifting thereof. And, when it is found that the illumination angle of the headlamp is shifted, if the aiming screw is rotated in such a manner that the shifting in the scale can be made to disappear, then the illumination angle can be adjusted to a proper angle.

In the present invention, to operate the aiming screw rotatively, for example, a driver may be inserted from above the headlamp along the reference element and, with the tip edge thereof engaged with the crown gear, the drive may be rotated. That is, the rotative operation of the aiming screw is easy. Especially, since the reference element acts as the side surface guide of the driver, the engagement between the driver tip edge and crown gear is hard to remove.

Further, according to the other aspect of the invention, since the nut element is moved in a direction extending along the reference element (that is, in a direction substantially at right angles to the aiming screw) due to the rotation of the aiming screw, the amount of projection of the inclination measuring device projecting backwardly of the reference element is small.

DESCRIPTION OF THE PREFERRED EMBODIMENTS

Next, description will be give below of the preferred embodiments of a headlamp for use in a vehicle according to the invention with reference to the accompanying drawings.

Figure 1:
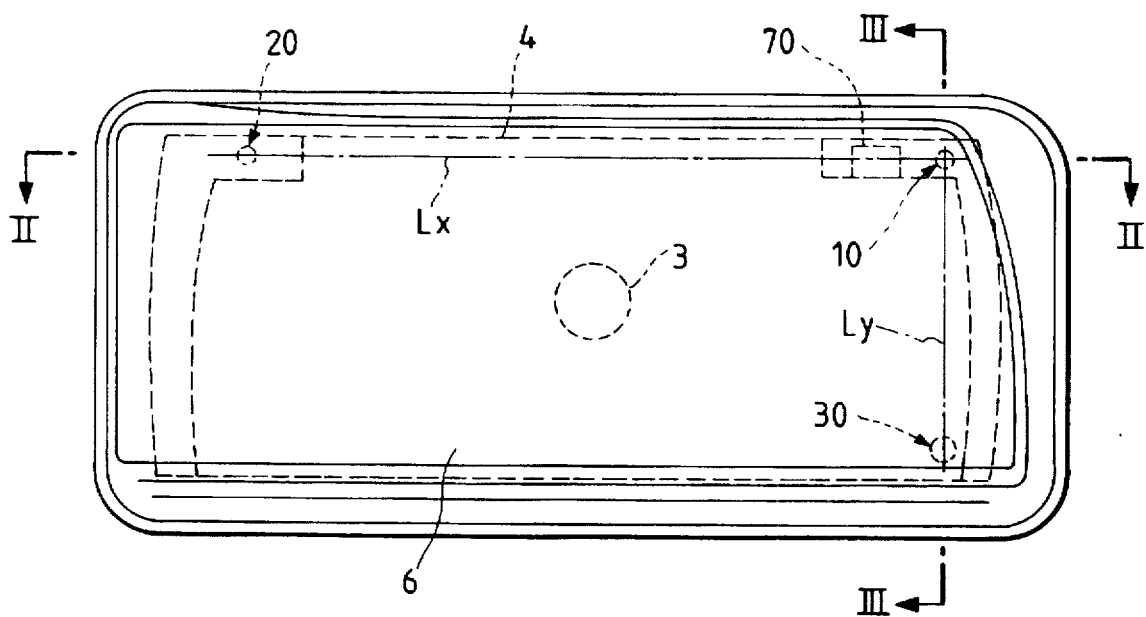
FIG. 1 is a front view of a first embodiment of a headlamp of a movable reflector type according to the invention.
Figure 2:
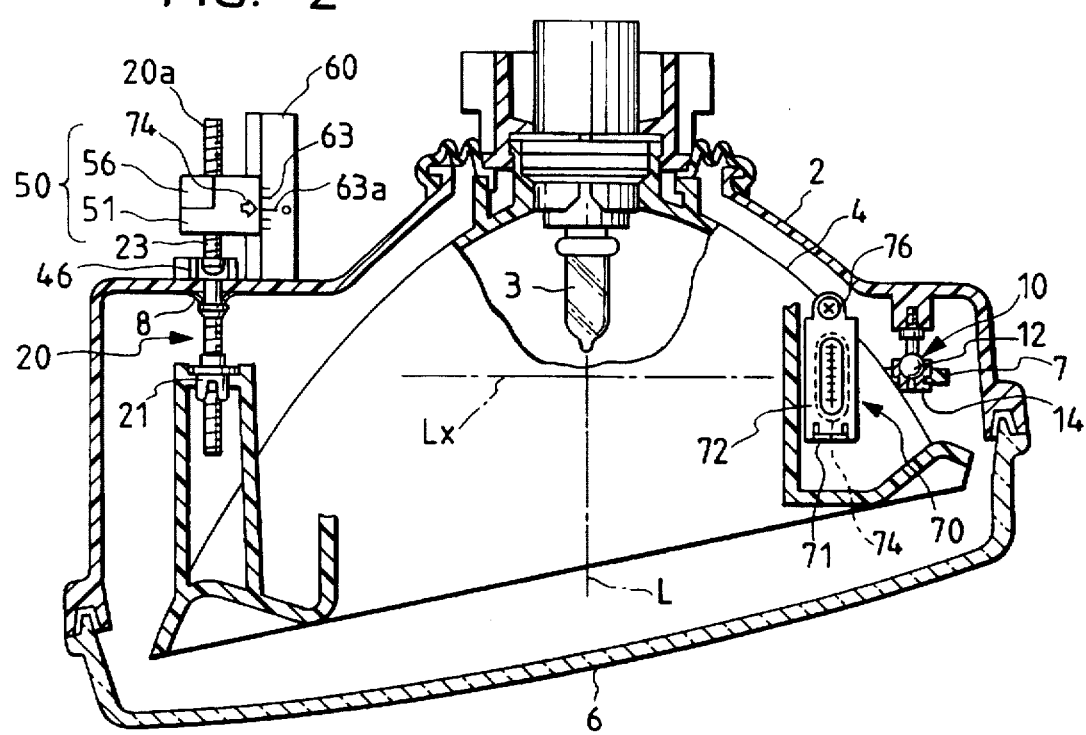
FIG. 2 is a horizontal section view of the above headlamp (that is, a section view taken along the line II—II shown in FIG. 1)
Figure 3:
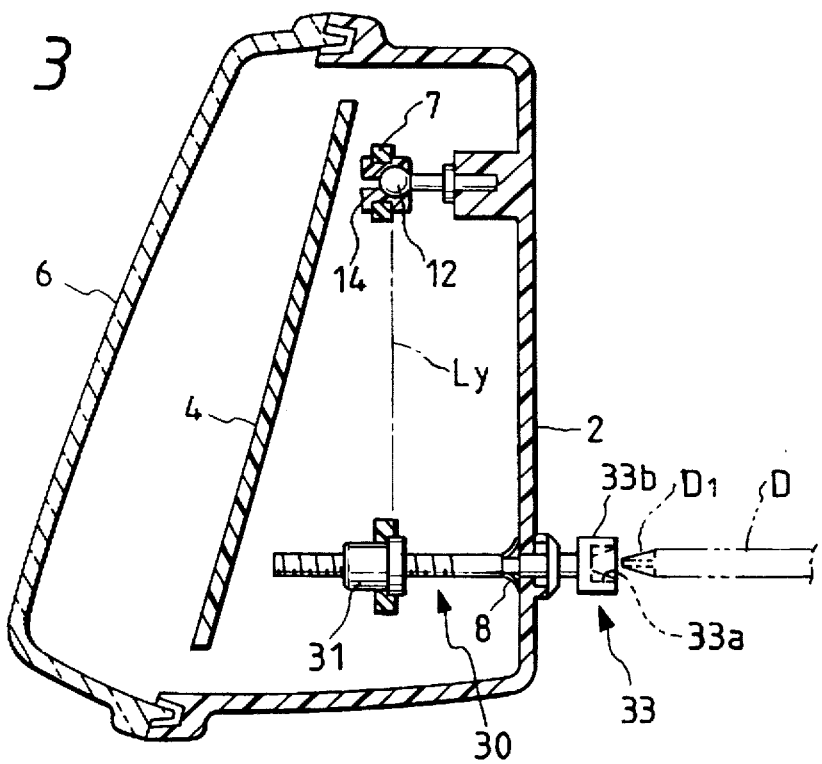
FIG. 3 is a longitudinal section view of the above headlamp (a section view taken along the line III—III shown in FIG. 1)
Figure 4:
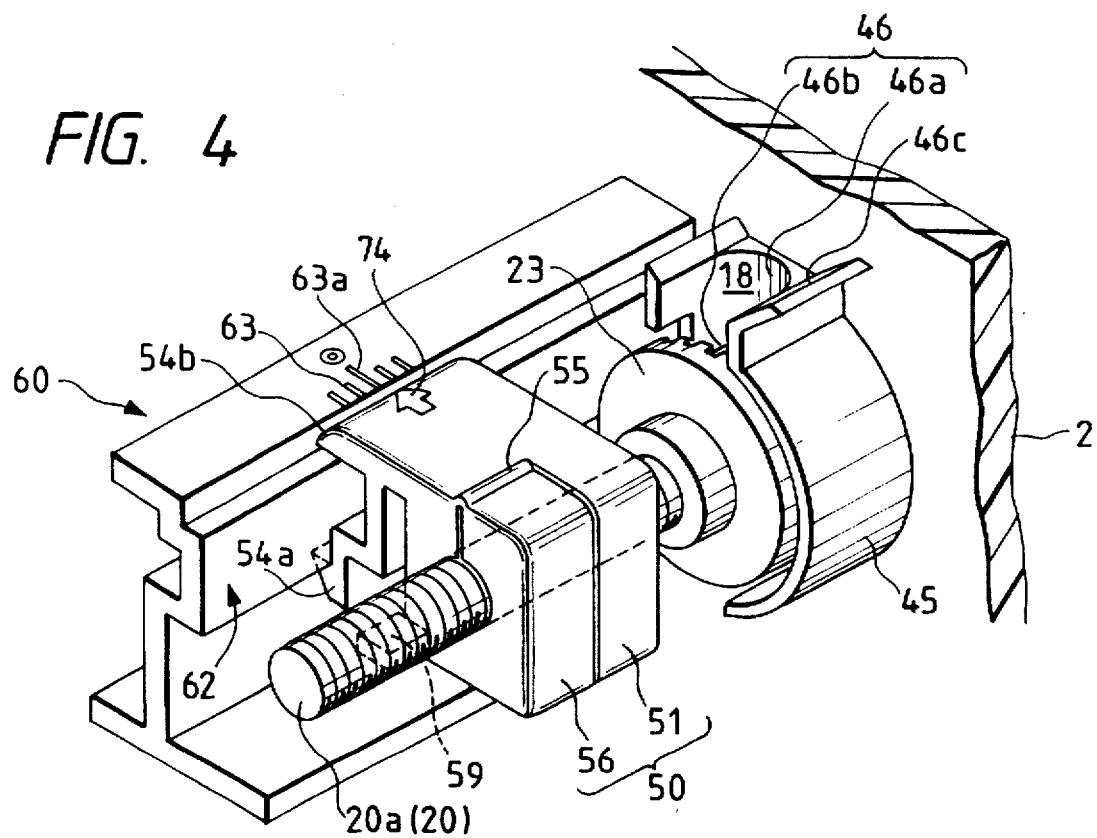
FIG. 4 is a perspective view of an inclination measuring device for measuring the inclination of the right and left illumination angle of the above headlamp.
Figure 5:
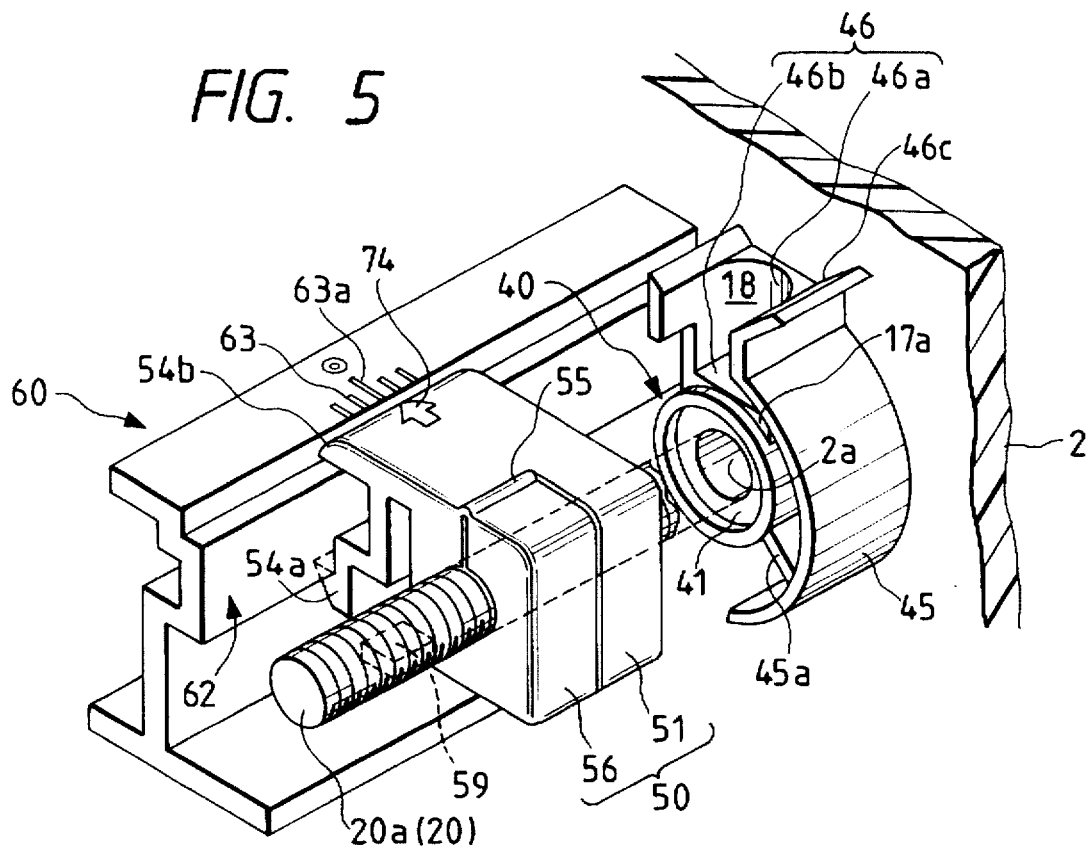
FIG. 5 is a perspective view of the neighborhood of the aiming screw bearing portion in the above headlamp.
Figure 6:
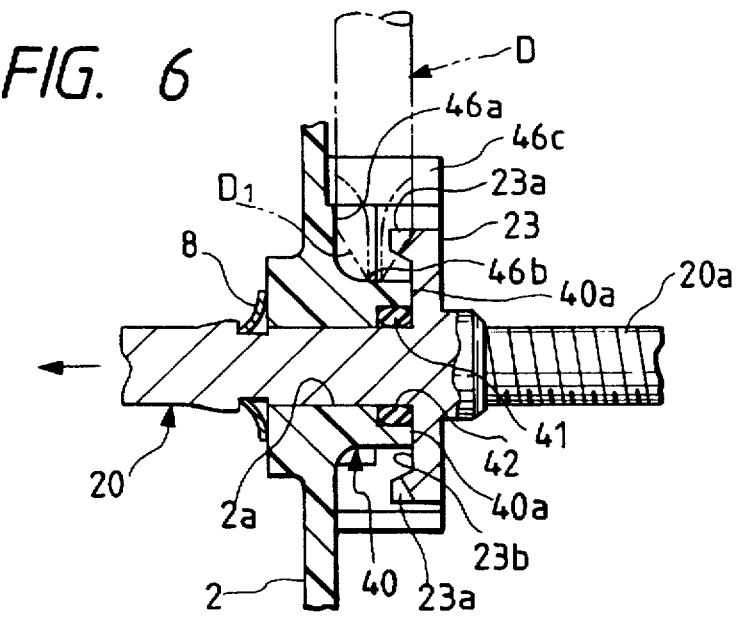
FIG. 6 is a section view of the neighborhood of the aiming screw bearing portion in the above headlamp.
Figure 7:
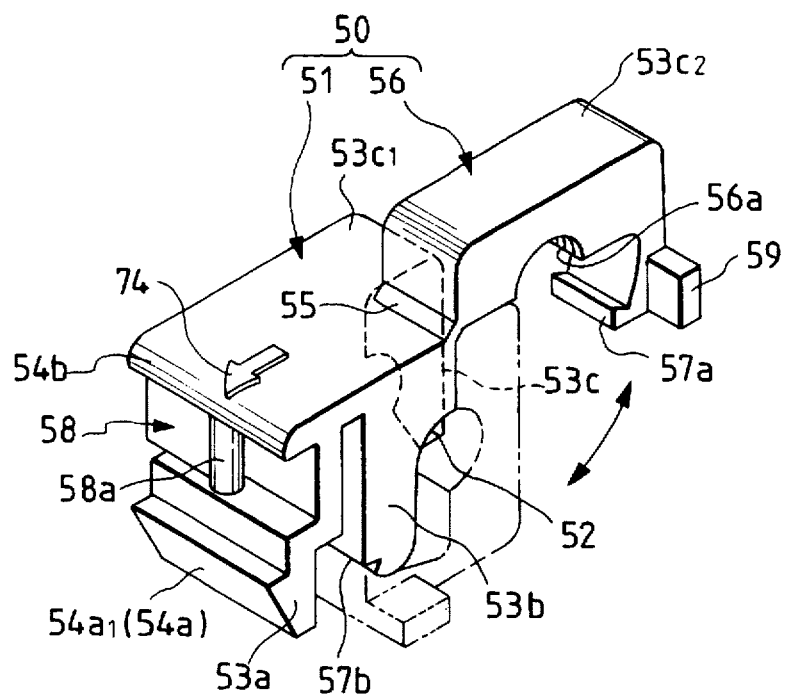
FIG. 7 is a perspective view of a nut element which is one of main components of the above inclination measuring device.
Figure 8:
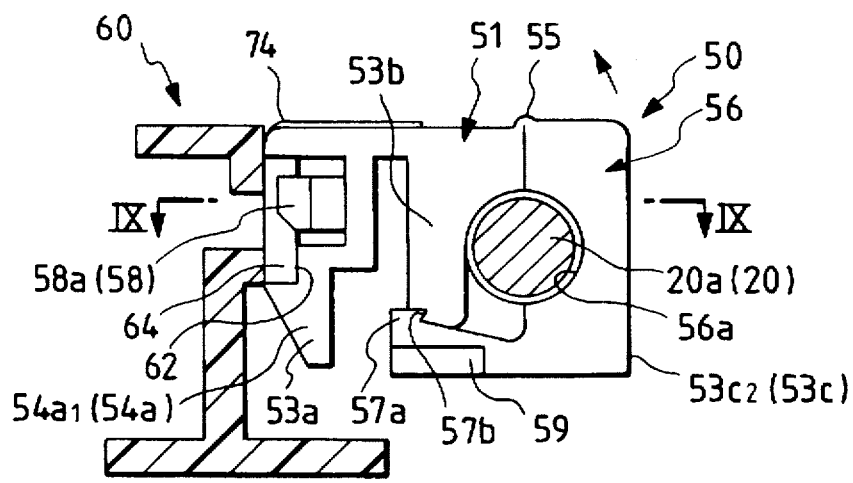
FIG. 8 is a partially broken view of the above inclination measuring device (a view obtained when viewed from the back surface side of the headlamp)
Figure 9:
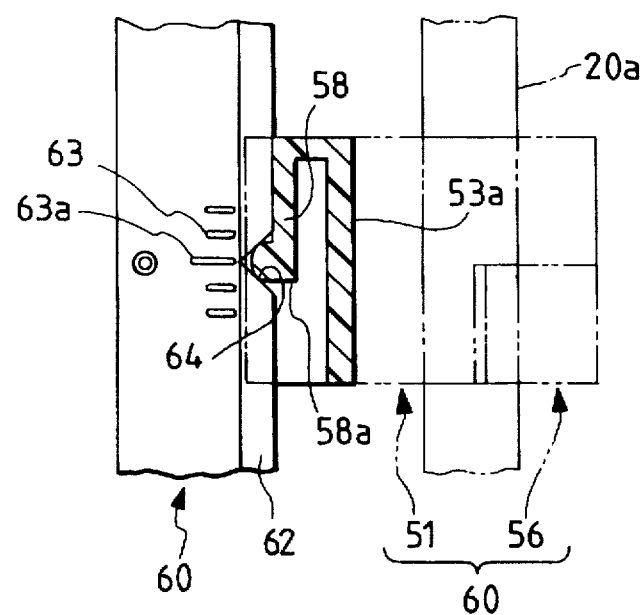
FIG. 9 is a horizontal section view of an uneven elastic securing portion formed between the nut element and guide element (a section view taken along the line IX—IX shown in FIG. 8)
Figure 10:
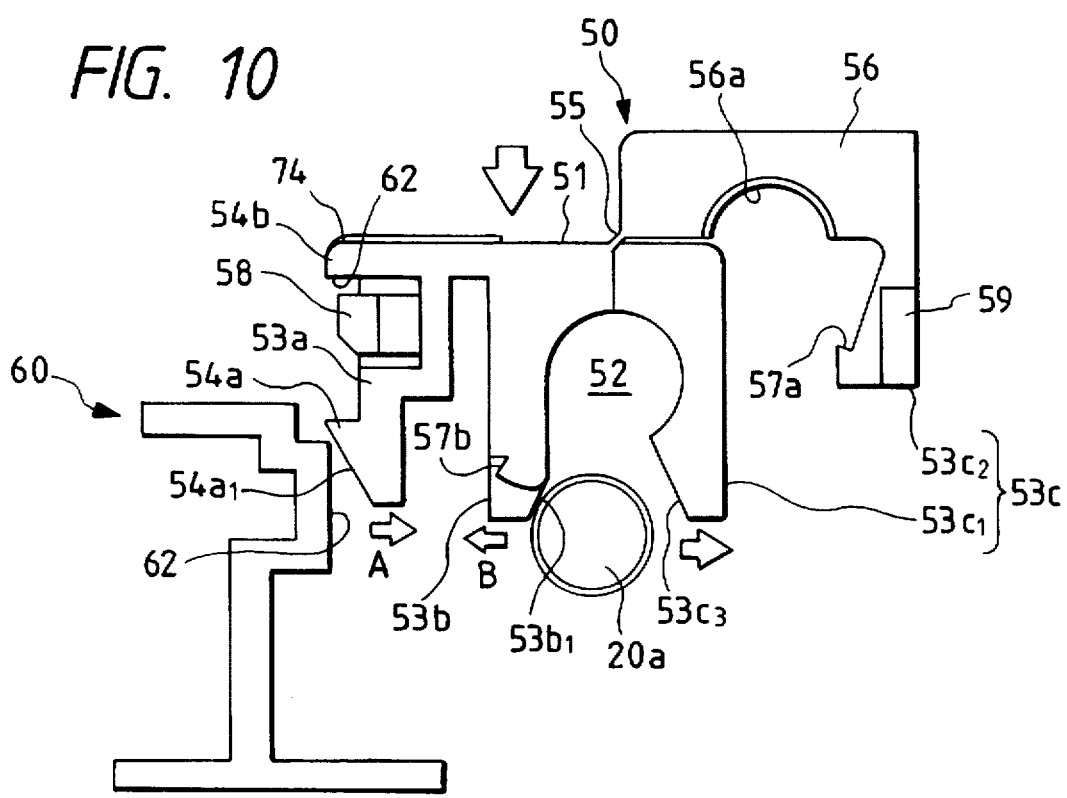
FIG. 10 is an explanatory view, showing how to assemble the above inclination measuring device to the headlamp.

In FIGS. 1 to 9, there is shown a first embodiment of the invention, that is, a headlamp of a movable reflector type that a lamp body serves as a reference element and a reflector acts as an inclinable element. In particular, FIG. 1 is a front view of the present headlamp of a movable reflector type incorporating therein an inclination measuring device, FIG. 2 is a horizontal section view (a section view taken along the line II—II shown in FIG. 1) of the present headlamp, FIG. 3 is a longitudinal section view (taken along the line III—III shown in FIG. 1) of the present headlamp, FIG. 4 is a perspective view of an inclination measuring device for measuring the inclination of the right and left angles of irradiation of the present headlamp, FIG. 5 is a perspective view of the neighborhood of the aiming screw bearing portion of the headlamp, FIG. 6 is a longitudinal section view of the neighborhood of the aiming screw bearing portion of the headlamp, FIG. 7 is a perspective view of a nut element used as one of the main components of the inclination measuring device, FIG. 8 is a partially broken view (when viewed from the back surface side of the headlamp) of the inclination measuring device, FIG. 9 is a horizontal section view (a section view taken along the line IX—IX shown in FIG. 8) of an uneven elastic securing portion between the nut element and guide element, and FIG. 10 is an explanatory view how to assemble the inclination measuring device to the headlamp.

In these figures, reference character 2 designates a container-like lamp body serving as a reference element. Within the lamp body 2, there is disposed a parabolic reflector 4 acting as an inclinable element into which a bulb 3 serving as a light source is inserted, and a front surface lens 6 is assembled to an opening formed in the front surface of the lamp body 2, which provides a united body acting as the headlamp.

The reflector 4, as shown in FIGS. 1 to 3, is supported within the lamp body 2 at three points, that is, the reflector 4 is supported by a ball and socket joint 10, a right and left direction aiming screw 20, and a vertical direction aiming screw 30. The ball portion 12 of the ball and socket joint 10 is fixed to and supported on the lamp body 2 side, and the ball receiving portion 14 of the joint 10 engageable with the ball portion 12 is inserted into and fixed to a bracket 7 projectingly provided on the back surface side of the reflector 4, while the reflector 4 can be oscillated about the ball and socket joint 10. Also, the aiming screws 20 and 30 are respectively formed of metal, extend through the lamp body 2 and further extend out back and forth therefrom, are supported by push-on fixtures 8 in the extend-through portions thereof, and are rotatably borne on the lamp body 2, while the front end portions of the aiming screws 20 and 30 are respectively in threaded engagement with screw support nuts 21, 31 which are screw bearing portions formed of synthetic resin and disposed on the reflector side 4.

At the root position of the extension portion of the aiming screw 20 extending out backwardly of the lamp body 2, as shown in FIGS. 4 and 6, there is formed integrally therewith a crown gear 23 with which the tip edge $D_1$ of the driver D is engageable. That is, if the tip edge $D_1$ of the driver D inserted along the back surface wall of the lamp body 2 is engaged with this crown gear 23 and the driver D is rotated to thereby rotate the aiming screw 20, then the nut 21 advances and retreats along the screw 20 to thereby be able to change the inclination of the reflector 4.

On the other hand, in the projecting portion of the aiming screw 30 projecting backwardly of the lamp body, there is provided a jig engaging portion which is shown by 33 in FIG. 3. The jig engaging portion 33 includes in the inside thereof a driver engaging portion 33a with which the tip edge $D_1$ of the driver is engageable, and in the outside thereof a wrench engaging portion 33b with which a hexagon wrench is engageable. For example, as shown in FIG. 3, by using the driver D inserted from the rear of the headlamp, or by using a hexagon wrench (not shown) inserted from above the headlamp along the back surface wall of the lamp body 2, the aiming screw 30 can be rotatably operated.

That is, the support point of the reflector by the right and left direction aiming screw 20 (the threadedly engaged portion between the aiming screw 20 and screw support nut 21) is supported on a horizonal axis Lx extending at right angles to the irradiation axis L (see FIG. 2) of the headlamp 2 and passing through the ball and socket joint 10, while the support point of the reflector by the vertical direction aiming screw 30 (the threadedly engaged portion between the aiming screw 20 and screw support nut 31) is situated on a vertical axis Ly extending at right angles to the horizontal axis Lx and passing through the ball and socket joint 10. Therefore, if the aiming screw 20 (30) is rotationally operated, then the screw support nut 21 (31) advances and retreats along the screw 20 (30) and thus the reflector 4 is inclined about the vertical axis Ly (horizontal axis Lx), thereby being able to adjusted the inclination of the reflector 4 acting as an inclinable element in the right and left directions (in the vertical direction) thereof with respect to the lamp body 2 acting as a reference element, that is, the illumination angles of the headlamp 2 in the right and left directions (in the vertical direction) thereof.

In the back surface side peripheral edge portion of the screw insertion hole 2a of the lamp body 2 through which the aiming screw 20 extends, as shown in FIGS. 5 and 6, there is formed integrally therewith a cylindrical driver support portion 40 in such a manner that it extends out backwardly from the screw insertion hole 2a. In the inner peripheral edge portion of an opening formed in the extension end side of the driver support portion 40, there is formed an annular recessed portion 41 into which is loaded an O ring 42 for sealing the screw insertion hole 2a. The teeth 23a of the crown gear 23, as shown in FIG. 6, are formed only in the outer peripheral edge portion of the main body of the crown gear 23, whereas there is formed a flat and smooth surface 23b on the inner peripheral edge side of the crown gear 23. Since the flat and smooth surface 23b of the crown gear 23 compresses the O ring 42 and is also brought into sliding contact with the extension end face 40a of the driver support portion 40, the aiming screw 20, which is energized in a forward direction (in a direction of an arrow shown in FIG. 6) by the push-on fixture 8 in the inside of the lamp body 2, can be positioned in the axial direction thereof, which assures that the aiming screw 20 can be rotated smoothly in the aiming screw bearing portion (that is, in the screw insertion hole 2a).

Also, on the one side of the right and left directions of the driver support portion 40 (that is, on the side thereof in which a guide element 60 to be discussed later is not disposed), there is provided an arc-shaped vertical wall 45 which is formed integral with the lamp body 2 and encloses substantially a half of the outer periphery of the crown gear 23. This vertical wall 45 prevents a cord or the like from being caught into the teeth 23a of the crown gear 23. In FIGS. 4 and 5, reference character 45a designates a reinforcing rib which extends radially from the driver support portion 40 to the vertical wall 45. In the upper-portion of the vertical wall 45, there is formed a driver engaging portion 46 which includes a vertically extending cylindrical inner peripheral surface 46a and a flat driver leading end portion contact surface 46b formed on the upper side surface of the driver support portion 40. That is, if the driver leading end portion is brought into contact with the contact surface 46b and the tip edge $D_1$ of the driver D is brought into mesh with the teeth 23a of the crown gear 23, then the side surface of the driver D can be guided by the cylindrical inner peripheral surface 46a, so that the driver D can be rotatively operated in a steady manner. Also, in the top portion of the driver engaging portion 46, there is formed a driver guide portion 46c which can be spread open right and left upwardly. Due to this, the tip edge $D_1$ of the driver D inserted from above can be guided or slided along the guide portion 46c to the driver engaging portion 46.

In FIGS. 2, 4 to 6, reference character 20a stands for a male screw portion which is formed integral with the projecting portion of the right and left aiming screw 20 projecting backwardly of the lamp body 2, while, in the back surface wall of the lamp body 2, a guide element 60 extending in parallel to the male screw portion 20a is formed integral with the lamp body 2. The guide element 60 includes a substantially U-shaped cross section and is increased in bending rigidity and torsional rigidity. And, between the guide element 60 and the male screw portion 20a of the aiming screw 20, there is assembled a first inclination measuring device which is used to measure the right and left inclination of the reflector 4, that is, the right and left inclination of the illumination angle of the headlamp. The inclination measuring device, as shown in FIGS. 7 and 8, includes a first leg 53a, a second leg 53b and a third leg 53c, a nut element 50, which has a rectangular shape when viewed from top and a YO-shape when viewed from front also which is in threaded engagement with the aiming screw male screw portion 20a and is assembled to the guide element 60 such that it can be slided back and forth with respect to the guide element 60, and a relative scale (consisting of a cursor 74 and a linear scale 63) formed between the nut element 50 and guide element 60.

The nut element 50, as shown in FIG. 7, is structured such that one portion $53c_2$ of the divided portions of the third leg 53c can be oscillated along the remaining divided portion 53c, of the third leg 53c and with respect to the second leg 53b. And, the nut element 50 comprises: a slide portion 51, which includes the first leg 53a, the second leg 53b and the portion $53c_1$ of the third leg 53c, and a cursor 74 corresponding to a linear scale 63 formed in the guide element 60, and can be slided along the guide element 60 and male screw portion 20a; and, a substantially rectangular screw hold portion 56 which includes the portion $53c_2$ of the third legs 53c and a female screw portion 56a threadedly engageable with the male screw 20a, and is formed integral with the slide portion 51 through a thin hinge 55. When the female screw portion 56a of the screw hold portion 56 is in threaded engagement with the male screw portion 20a of the aiming screw (see FIG. 8), the amount of right and left inclination of the reflector 4 appears as the amount of movement of the cursor 74 of the slide portion 51. In view of this, if the cursor 74 is previously adjusted to a position of a zero point 63a of the scale 63 (which will be hereinafter referred to as zero point adjustment), then the right and left inclination of the reflector 4 can be detected from a scale display given by the cursor 74.

The slide portion 51 and screw hold portion 56 are respectively formed of synthetic resin such as nylon, ABS or the like into integral bodies and they can be oscillated to each other about the thin hinge 55 connecting them to each other (see an arrow shown in FIG. 7). Between the second leg 53b and third leg portion $53c_1$ of the slide portion 51, as shown in FIG. 10, there is formed a circular hole 52 which is larger in diameter than the male screw portion 20a of the aiming screw 20, while the aiming screw male screw portion 20a can be introduced into the circular hole 52 from the opening side of the circular hole 52 formed slightly narrower than the outside diameter of the circular hole 52. That is, as shown in FIG. 10, while inclined surfaces $53b_1$ and $53c_3$ for screw introduction respectively formed in the lower end portions of the mutually opposing surfaces of the legs 53b and 53c, are butted against the male screw portion 20a of the aiming screw, if the slide portion 51 is pushed toward the male screw portion 20a (in FIG. 10, in a downward direction), then the legs 53b and $53c_1$ are pushed open outwardly due to the elasticity thereof (see arrows B and C in FIG. 10), so that the male screw portion 20a can be engaged (loosely engaged) with the circular hole 52.

Also, in the lower end portion of the leg 53a on the side thereof to be contacted with the guide element 60, there is formed a hook 54a expanding outwardly (on the side thereof facing the guide element 60). The hook 54a cooperates with an eaves-like horizontal guide 54a formed in the upper end portion of the leg 53a to maintain the nut element 50 in engagement with the guide element 60. That is, an inclined surface 54a, is formed in the outer surface of the hook 54a and, when the nut element 50 is engaged with the male screw portion 20a (that is, when the male screw portion 20a is introduced into the circular hole 52), the inclined surface 54a$_1$ is pressed by the side surface projecting strip portion 62 of the guide element 60 and is thereby elastically formed as shown by an arrow A in FIG. 10, and the side surface projecting strip portion 62 of the guide element 60 is engaged into a recessed portion formed between the horizontal guide 54b and hook 54a of the nut element 50, so that the leg 53a of the nut element 50 is prevented from slipping off upwardly.

On the other hand, on the side of the screw hold portion 56 opposed to the circular hole 52, there is formed a female screw portion 56a and, in the lower end portion of the leg 53b of the slide portion 51, there is formed an elastic hook 57a engageable with an engaging recessed portion 57b formed in the lower end portion of the leg 53b of the slide portion 51. If the elastic hook 57a is engaged with the engaging recessed portion 57b, then the screw hold portion 56 is secured in such a manner that it holds the aiming screw male screw portion 20a, and the female screw portion 56a of the screw hold portion 56 is maintained in threaded engagement with the aiming screw male screw portion 20a. That is, in a state in which the elastic hook 57a is in engagement with the engaging recessed portion 57b and the screw hold portion 56 holds the aiming screw male screw portion 20a (namely, in a state in which the female screw portion 56a is in threaded engagement with the aiming screw male screw portion 20a), since the outer surface of the leg 53a is butted against the guide element 60 to thereby prevent the nut element 50 against rotation, in linking with the rotation of the aiming screw 20, the nut element 50 can be slided back and forth along the guide element 60 by an amount proportional to the amount of rotation of the aiming screw 20.

Now, reference character 58 stands for a plate-like elastic engaging piece which, as shown in FIG. 9, is formed such that it extends from and along the leg 53a of the slide portion 51 in parallel thereto. When the aiming screw male screw portion 20a is in loose engagement with the circular hole 52 in the slide portion 51, the leading end expansion portion 58a of the elastic engaging piece 58 is energized and butted against the side surface projecting strip portion 62 of the guide element 60. Also, according to the present structure, at a position where the leading end expansion portion 58a is in engagement with a V-shaped groove 64 formed in the side surface projecting strip portion 62 of the guide element 60, the cursor 74 is set to be situated at a scale zero point 63a. Therefore, if the leading end expansion portion 58a is engaged with the V-shaped groove 64, then the nut element 50 can be secured provisionally at the given position, that is, the scale zero point. Here, reference character 59 designates a knob which is projectingly formed in the lower end (oscillating leading end) side portion of the screw hold portion 56 for operating the screw hold portion 56.

Now, the thin hinge 55 contains therein an initial stress which energizes and rotates the screw hole portion 56 counterclockwise (in a direction of an arrow) in FIG. 7. That is, when the slide portion 51 and screw hold portion 56 are formed integral with each other, as shown in FIG. 10, the thin hinge 55 is formed in such a manner that it extends straight, whereas, as shown in FIG. 8, when the elastic hook 57a of the thin hinge 55 is in engagement with the engaging recessed portion 57a of the slide portion 51, the bent thin hinge 55 contains therein the initial stress that energizes the bent thin hinge 55 to return to its initial state. For this reason, if the elastic hook 57a is disengaged from the engaging recessed portion 57b, then the screw hold portion 56 is naturally oscillated around the thin hinge 55 due to the restitutive force of the thin hinge 55 and is thereby jumped up as shown in FIG. 7. In other words, by pinching the knob 59 with fingers, or by removing the engagement of the elastic hook 57a with the engaging recessed portion 57b using an aiming screw rotatively operating jig such as a driver or the like, the threaded engagement between the screw hold portion 56 and aiming screw male screw portion 20a can be removed simply (that is, the linkage between the nut element 50 and aiming screw 20 can be removed simply).

Also, the aiming adjustment and the scale zero point adjustment in the inclination measuring device can be made in the following manner:

As shown in FIG. 8, when the screw hold portion 56 is in threaded engagement with the aiming screw male screw portion 20a and the nut element 50 is in linkage with the aiming screw 20, the engagement between hook 57a and engaging recessed portion 57b is removed to cause the screw hold portion 56 to jump up, thereby removing the linkage between the nut element 50 and the aiming screw male screw portion 20a. Next, if the nut element 50 is slided along the guide element 60 to bring the leading end expansion portion 58a of the elastic engaging piece 58 into engagement with the V-shaped groove 64, then the cursor 74 is naturally situated at the scale zero point 63a. That is, the scale zero point adjustment can be achieved.

Next, if the aiming screw 20 is rotatively operated by use of a driver D inserted from above the headlamp along the back surface wall of the lamp body 2, then the aiming adjustment can be made. Here, since the nut element 50 and aiming screw 20 are not linked to each other, even if the aiming screw 20 is rotated, the nut element 40 is little influenced by the rotation of the aiming screw 20. In addition to this, since the nut element 50 is energized and held at a scale zero point (a point at which the cursor 74 displays the zero point 63a) due to the engagement between the elastic engaging piece 58 (the leading end expansion portion 58a thereof) on the nut element 50 side and the V-shaped groove 64 on the guide element 60 side, the aiming adjustment can be achieved without putting the scale zero point adjustment out of order.

After completion of the aiming adjustment, if the screw hold portion 56 is oscillated around the thin hinge 55 to bring the elastic hook 57a into engagement with the engaging recessed portion 57b, then the nut element 50 comes to hold the male screw portion 20a (that is, the female screw portion 56a and male screw portion 20a are threadedly engaged with each other), so that the rotation of the aiming screw 20 is linked to the sliding operation of the nut element 50 (that is, in this linking state, it is possible to detect the shifting of the illumination angle of the headlamp). In this state in which the nut element 50 is linked to the aiming screw 20, if the aiming screw 20 is rotated using the driver D, the nut element 50 can be slided against the engagement retaining force due to the engagement between the elastic engaging piece 58 and V-shaped groove 64, which allows the inclination measuring device to display the shifting of the right and left illumination angle of the headlamp accurately. In other words, when the reflector 4 is inclined due to vibration or the like, the inclination of the reflector 4 causes the aiming screw 20 to rotate with respect to the screw support nut 21, and the rotation of the aiming screw 20 causes the nut element 50 to advance and retreat along the aiming screw male screw portion 20a, that is, the nut element 50 is slided along the guide element 60 accurately by an amount corresponding to the amount of inclination of the reflector 4, so that the amount of sliding of the nut element 50 appears as the shifting of the scale (the scale to be displayed by the cursor 74).

Also, the assemble the first inclination measuring device to the aiming screw 20, as shown in FIG. 10, the nut element 50 (slide portion 51) is assembled to (that is, is loosely engaged with) the aiming screw male screw portion 20a from above the male screw portion 20a. That is, with the screw hold portion 56 jumped up, the opening side of the slide portion 51 is turned downside, the aiming screw male screw portion 20a is introduced into the circular hole 52 along the screw introducing inclined surfaces 53b, and 53c_3, and the circular hole 52 is (loosely) engaged with the male screw portion 20a. Then, if the nut element 50 (slide portion 51) is slided along the guide element 60 to bring the leading end expansion portion 58a of the elastic engaging piece 58 into engagement with the V-shaped groove 64 of the guide element 60, then the slide portion 51 is naturally held at a position which is zero point adjusted. Also, when the aiming screw male screw portion 20a is (loosely) engaged with the circular hole 52, the aiming screw male screw portion 20a may be introduced into the circular hole 52 while the leading end expansion portion 58a of the elastic engaging piece 58 in engagement with the V-shaped groove 64. In this manner, the zero point adjustment can be made at a time when the nut element 50 is (loosely) engaged with the aiming screw 20.

In FIGS. 1 and 2, reference character 70 designates an inclination measuring device of an air bubble pipe type which measures the vertical inclination of the reflector 4, that is, the vertical inclination of the illumination angle of the headlamp. The inclination measuring device 70 includes a container-like casing 71 mounted on the upper surface wall of the reflector 4 and opened upwardly, a cover body 72 supported on the casing 71 such that it can be oscillated with respect to the horizontal shaft Lx, and a linear air bubble pipe 74 suspended from and supported by the cover body 72 and stored within the casing 71. 76 stands for an adjusting screw which is used to make a zero adjustment of the air bubble pipe 74.

Figure 11A:
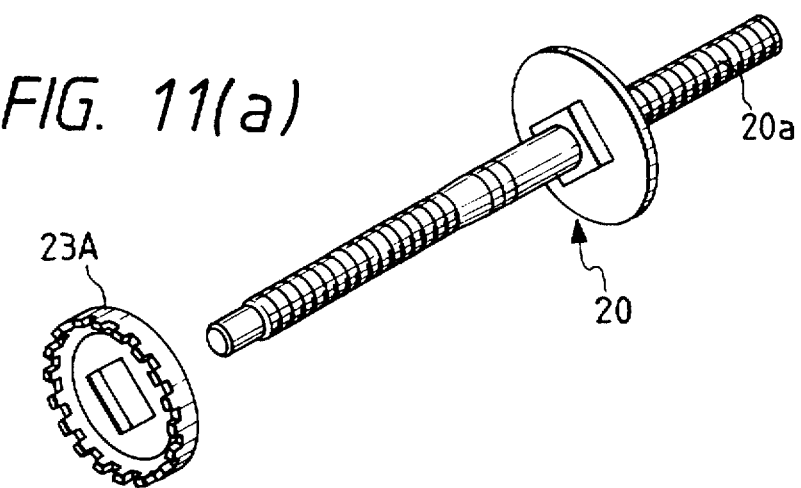
FIGS. 11(a)–(c) is a section view of various structures for uniting together the aiming screw, crown gear and male screw portion into an integral body.
Figure 11B:
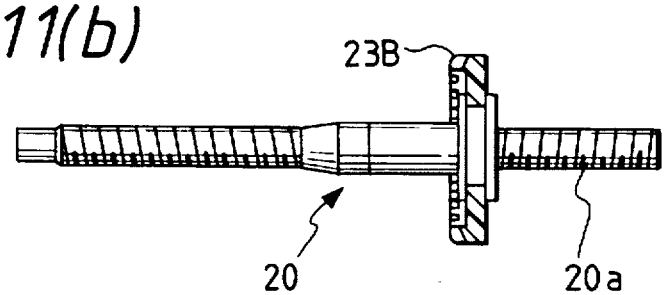
Figure 11C:
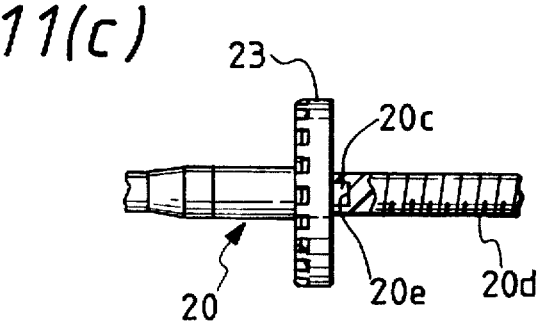

In the above-mentioned embodiment, the crown gear 23 and male screw portion 20a are formed integral with the aiming screw 20 formed of metal. However, this is not limitative but other structures are also possible. For example, as shown in FIG. 11(a), a crown gear 23A, which is formed of metal as a separate part, may be fitted with the aiming screw 20 including the male screw portion 20a formed integral therewith, thereby producing a united body; or, as shown in FIG. 11(b), a crown gear 23B formed of synthetic resin may be inserted into a metal aiming screw 20 including a male screw portion formed integral therewith to thereby produce a united body. Further, as shown in FIG. 11(c), the front end engaging recessed portion 20e of a mail screw portion 20d formed of synthetic resin as a separate part can be pressed into and fixed to the rear end engaging projecting portion 20c of the metal aiming screw 20 including the crown gear 23 formed integral therewith, whereby the aiming screw 20 and male screw portion 20d can be united together into an integral body.

Figure 12:
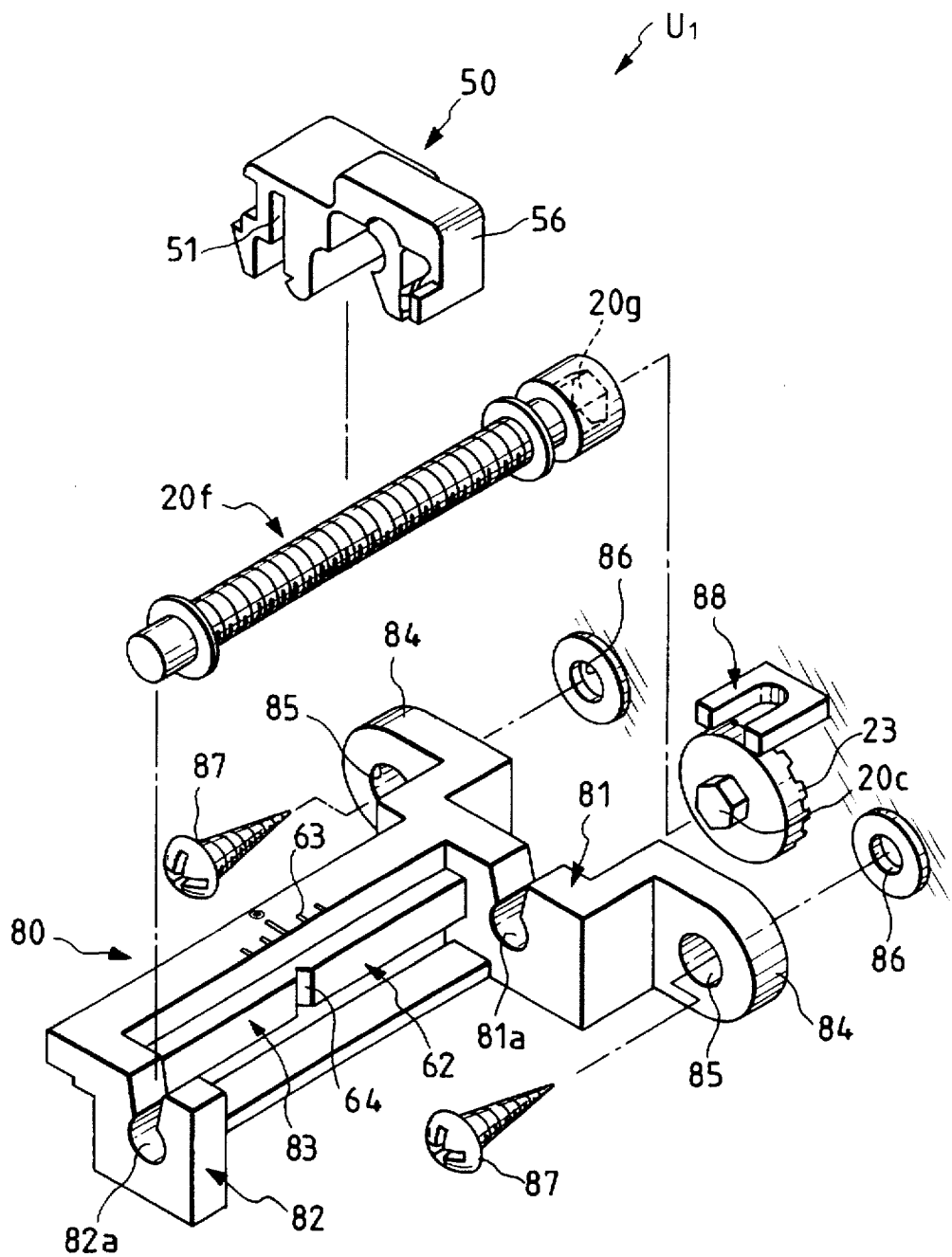
FIG. 12 is an exploded perspective view of an inclination measuring device which is one of main components of a second embodiment of a headlamp for use in a vehicle according to the invention.

Now, FIG. 12 is an exploded perspective view of an inclination measuring device which is a main part of a second embodiment of a headlamp of a movable reflector type according to the invention.

In the second embodiment, the aiming screw male screw portion 20a, guide element 60 and nut element 50 respectively used in the first embodiment are assembled together into a united body to produce an inclination measuring device unit $U_1$. That is, according to the second embodiment, the inclination measuring device unit $U_1$ may only be fixed to the given position of the lamp body 2.

In particular, reference character 80 designates a frame-shaped measuring device case which includes front and rear frames 81 and 82 opposed to each other in the longitudinal direction thereof. The front and rear frames 81 and 82 respectively include bearings 81a and 82a which are respectively opened upwardly and are used to bear the two end portions of a male screw portion 20f. The male screw portion 20f is formed of metal and includes in the front end portion thereof an engaging recessed portion 20g engageable with an engaging projecting portion 20c provided in the rear end portion of the aiming screw 20. The case further includes a side frame 83 which corresponds to the guide element 60 employed in the first embodiment. The side frame 83 includes a linear scale 63 in the upper surface thereof ad a side surface projecting portion 62 in the inside surface thereof. The front frame 81 includes a pair of right and left flange portions 84 respectively having screw insertion holes 85 and 85, while the lamp body 2 includes on the back surface wall thereof screw hole 86 and 86 respectively corresponding to the screw insertion holes 85 and 85, so that the flange portions 84 can be fixed to the lamp body 2 by use of screws 87.

Therefore, in the second embodiment, the nut element 50 is assembled to the male screw portion 20f borne rotatably by the case 80 to thereby unite them together into the measuring device unit $U_1$. Next, while the unit $U_1$ is positioned such that the front end engaging recessed portion 20g of the male screw portion 20f is engaged with the rear end engaging projecting portion 20c of the aiming screw 20, the unit $U_1$ is fixed to the back surface of the lamp body 2 by screws. Hence, in FIG. 12, reference character 88 stands for a driver contact guide which is formed integral with the lamp body 2 and corresponds to the driver engaging portion 46 employed in the first embodiment.

Figure 13:
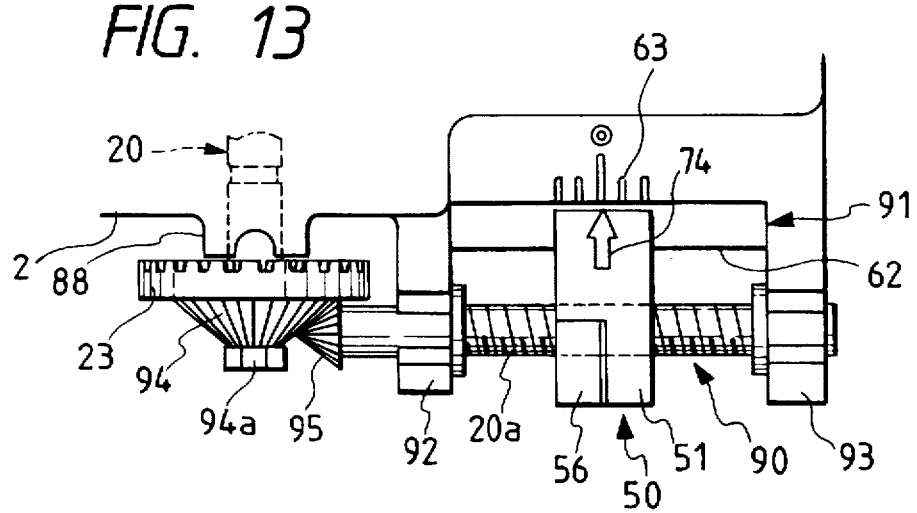
FIG. 13 is a plan view of an inclination measuring device which is one of main components of a third embodiment of a headlamp for use in a vehicle according to the invention.
Figure 14:
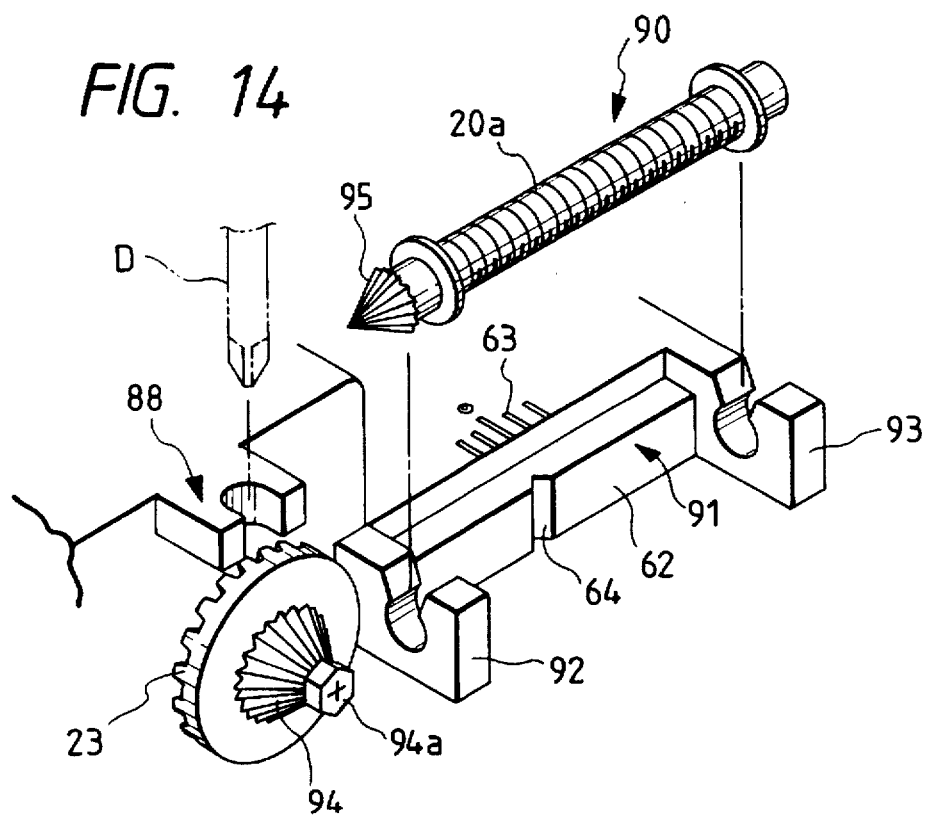
FIG. 14 is an exploded perspective view of the above inclination measuring device.

Now, in FIGS. 13 and 14, there is shown a third embodiment of a headlamp for use in a vehicle according to the invention. In particular, FIG. 13 is a plan view of an inclination measuring device which is a main part of a headlamp of a movable reflector type, and FIG. 14 is an exploded perspective view of the above inclination measuring device.

While the previously described first and second embodiments respectively employ a structure that the male screw portion 20a is disposed in the rear end portion of the aiming screw 20 is a coaxial manner, in the third embodiment, not only the male screw portion is separated from the aiming screw 20 but also the male screw portion is disposed in a direction at right angles to the extending direction of the aiming screw 20. That is, reference character 90 stands for a driven shaft which includes the male screw portion 20 on the outer peripheral surface thereof. The driven shaft 90 is supported by bearing elements 92 and 93 respectively formed on and projected from the back surface of the lamp body 2, is disposed in a horizontal direction at right angles to the aiming screw 20, and extends along the back surface wall of the lamp body 2.

The aiming screw 20 includes in the rear end portion thereof a crown gear 23 and a bevel gear 94 which are formed integral with each other, while the driven shaft 90 includes in the leading end portion thereof a bevel gear 95 which is meshable with the bevel gear 94. That is, the two bevel gears 94 and 95 cooperate together in forming a right angle change gear mechanism which transmits the rotational movement of the aiming screw 20 to the driven shaft 90 disposed at right angles to the aiming screw 20. Also, the portion of the back surface wall of the lamp body 2 existing between the two bearing elements 92 and 93 is formed in such a shape as corresponds to the guide element 60 employed in the first embodiment. That is, a linear scale 63 is formed in the horizontal belt-shaped portion of the lamp body 2, a projecting strip portion 62 on which the nut element 50 is slidable is formed on the back surface side of the horizontal belt-shaped portion, and a V-shaped groove 64 is formed in the projecting strip portion 62, thereby forming a guide portion 91. The remaining portions of the third embodiment are similar to those of the first embodiment. Therefore, they are given the same designations and the description thereof is omitted here.

In the third embodiment, there is not employed the structure that the male screw portion projects greatly on the back surface side of the lamp body 2 as in the previously described first and second embodiments, so that the longitudinal dimensions of the headlamp are smaller by an amount equivalent to the male screw portion than the headlamps according to the first and second embodiments. Therefore, not only a space necessary for provision of a headlamp can be reduced accordingly, but also there can be provided a high freedom of design when the headlamp is mounted onto a vehicle.

Further, in the rear end portion of the aiming screw 20, there is formed a jig engaging portion 94a with which not only the tip edge $D_1$ of the driver D but also a hexagon wrench (or a hexagon spanner) are engageable. When it is difficult to rotate the crown gear 23 by use of the driver D, the crown gear 23 may be rotated by rotating the jig engaging portion 94a by use of the driver D and hexagon wrench (or a hexagon spanner).

Figure 15:
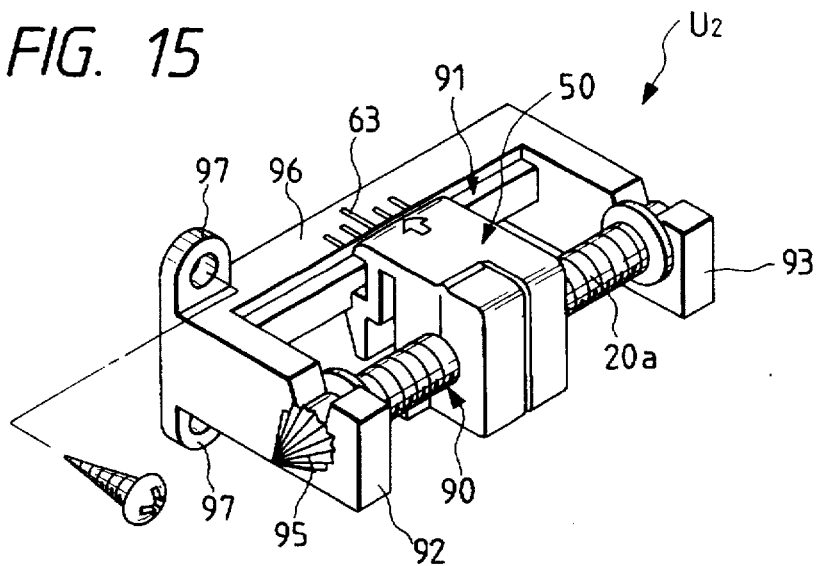
FIG. 15 is a perspective view of an inclination measuring device which is one of main components of a fourth embodiment of a headlamp for use in a vehicle according to the invention.

Now, FIG. 15 shows a fourth embodiment of a headlamp for use in a vehicle according to the invention and, in particular, it shows a perspective view of an inclination measuring device which is a main part of a fourth embodiment of a headlamp of a movable reflector type for use in a vehicle according to the invention.

In the fourth embodiment, the driven shaft 90, bearing elements 92, 93, guide element 91 and nut element 50 respectively employed in the above-mentioned third embodiment are united together to thereby form a measuring device unit $U_2$. That is, the driven shaft 90 and nut element 50 are assembled to a frame-shaped measuring device case 96, which includes therein the bearing elements 92, 93 and guide element 91 previously formed integral with one another, thereby producing the measuring device unit $U_2$; and, with a bevel gear 95 provided on the driven shaft side in mesh with a bevel gear provided on the aiming screw side, a flange portion 97 formed in the case 96 is fixed to the lamp body by screws.

FIGS. 16 to 22 show a fifth embodiment of the invention, that is, a headlamp of a movable reflector type that a lamp body serves as a reference element and a reflector acts as an inclinable element.

Figure 16:
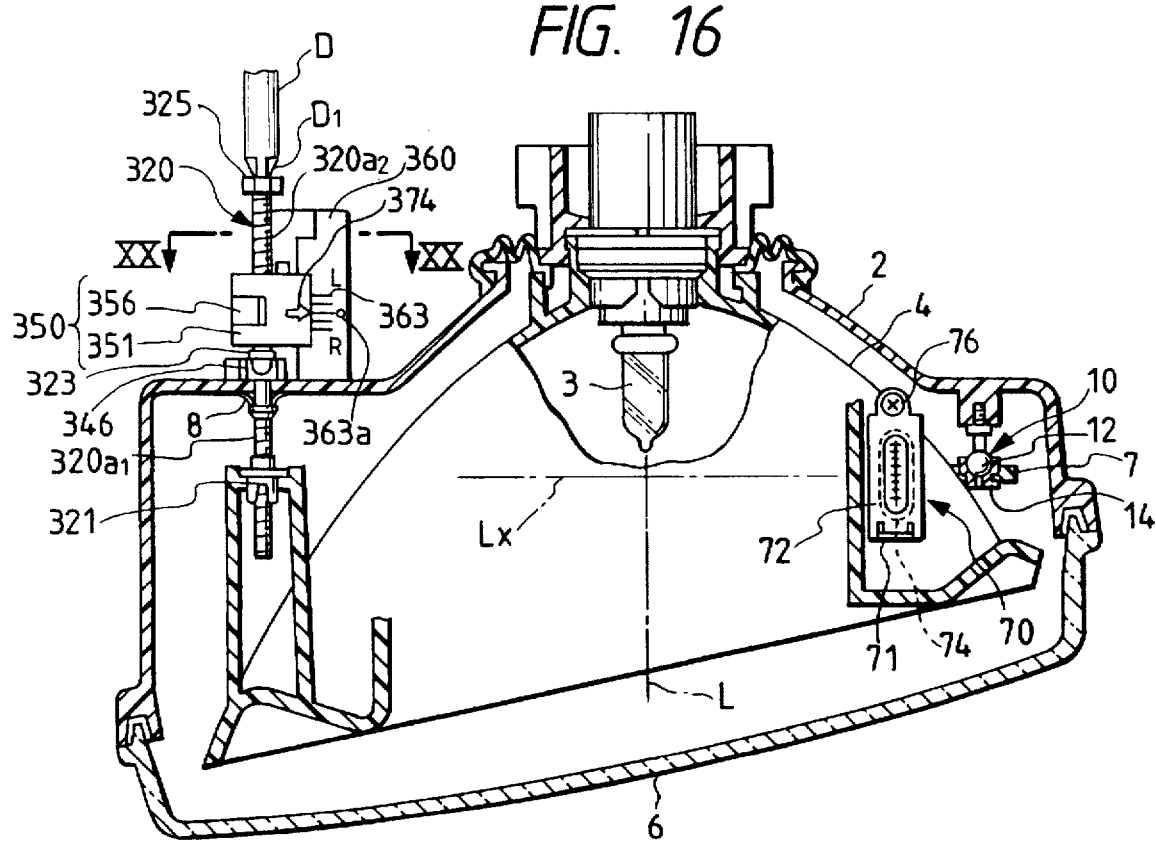
FIG. 16 is a horizontal section view of a headlamp according to a fifth embodiment of the invention.
Figure 17:
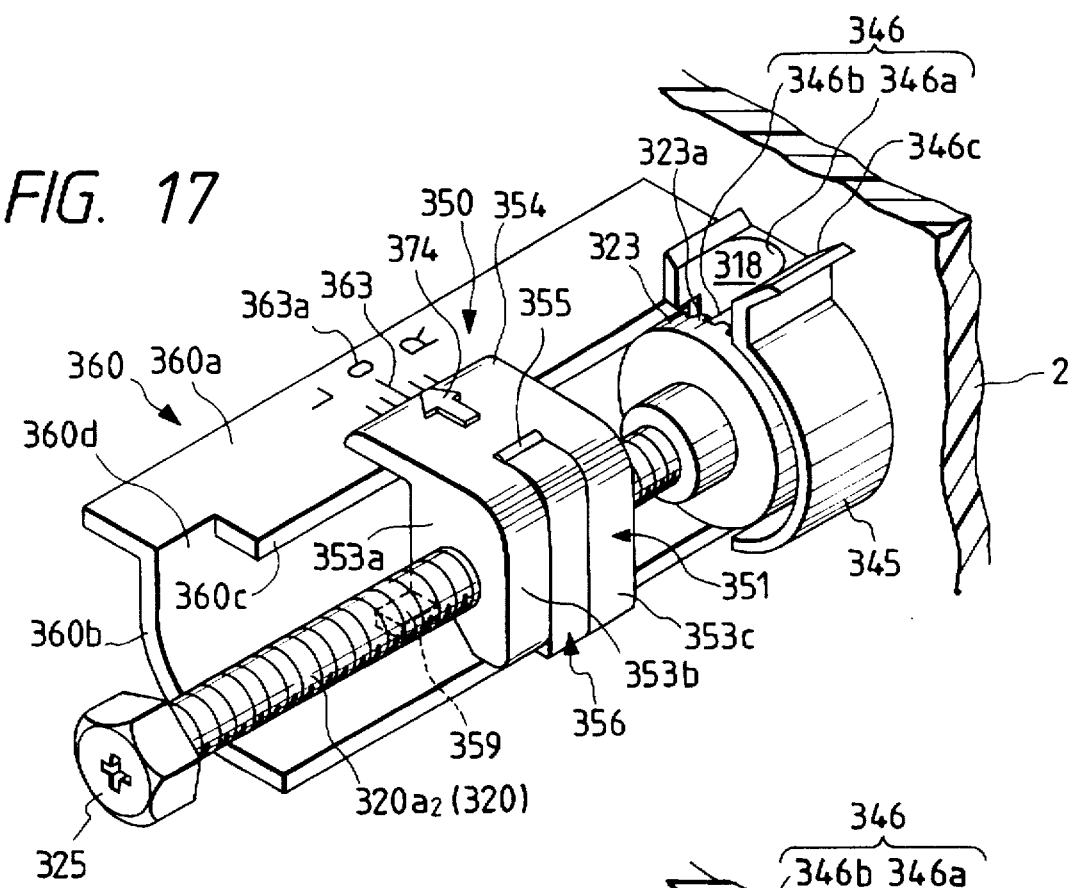
FIG. 17 is a perspective view of an inclination measuring device for measuring the inclination of the right and left illumination angle of the headlamp shown in FIG. 16.

In FIGS. 16 and 17, reference character $320a_2$ stands for a male screw portion which consists of a single- or double-threaded right hand screw and is formed in the extension portion of the right and left direction aiming screw 320 extending backwardly of the lamp body 2. On the other hand, to the back surface wall of the lamp body 2, there is fixed a guide element 360 having a T-shaped cross section which extends in parallel to the male screw portion $320a_2$. The guide element 360 includes a crossbar-shaped portion 360a having a T-shaped section. In the upper surface of the crossbar-shaped portion 360a, there is formed a linear scale 363 which extends in the guide element extending direction. Also, the guide element 360 further includes a vertical-bar-shaped portion 360b having a T-shaped section which is curved in an arc manner toward the aiming screw 320. Due to this structure, the guide element 360 is increased in the rigidity strength thereof. Now, reference character 350 designates a slider which is assembled between the male screw portion $320a_2$ of the aiming screw 320 and the guide element 360 and forms a first inclination measuring device for measuring the inclination of the reflector 4 in the right and left direction, that is, the inclination of the illumination angle of the headlamp in the right and left direction.

The slider 350 includes a slide portion 351, which is partly cut away and has a U shape when it is viewed as a plan view and also as a front view, and a substantially rectangular screw hold portion 356. In particular, the slide portion 351 is prevented against rotation when it is engaged with the side edge portion 360c of the guide element 360 on the aiming screw side, and is slidable back and forth with respect to the guide element 360 when it is loosely fitted with the male screw portion $320a_2$ of the aiming screw 320. On the other hand, the screw hold portion 356 includes a female screw portion 356a meshable with the male screw portion $320a_2$ and is formed integral with the cutaway portion 351a of the slide portion 351 through a thin hinge 355. And, a relative scale (which consists of a cursor 374 and linear scale 363) is provided between the slide portion 351 of the slider 350 and the guide element 360. That is, the first inclination measuring device is structured in this manner. And, while the female screw portion 356a of the screw hold portion 356 is in threaded engagement with the male screw portion $320a_2$1 the amount of inclination of the reflector 4 in the right and left direction (that is, the amount of inclination of the reflector 4 about the vertical axis Ly) appears as the amount of movement of the cursor 374 of the slide portion 351. For this reason, if the cursor 374 is previously adjusted to the position of a zero point 363a in the scale 363 (which is hereinafter referred to as a zero point adjustment), then the degree of inclination of the reflector 4 in the right and left direction can be checked from the scale that is displayed by the cursor 374.

Figure 20:
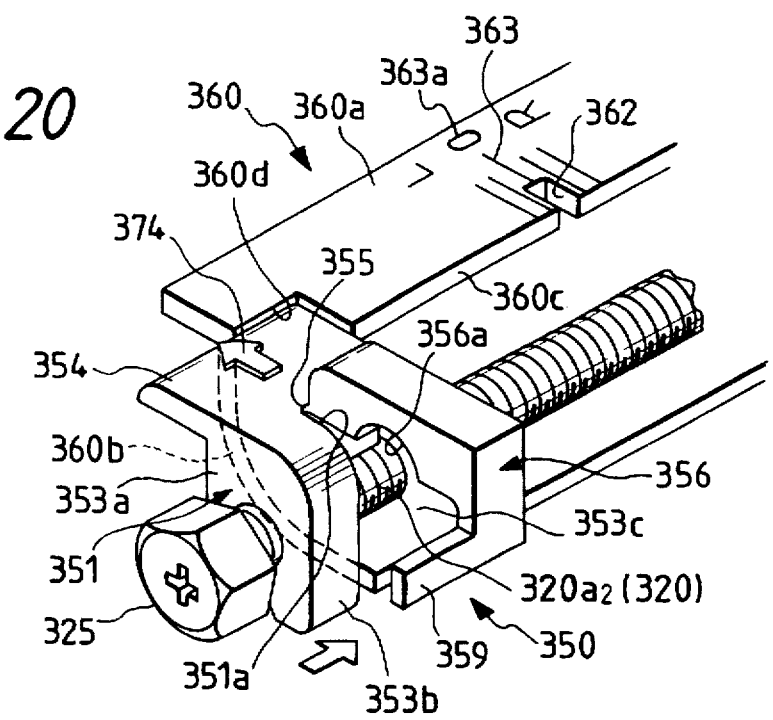
FIG. 20 is a perspective view of an essential components of the slider and the aiming screw according to the fifth embodiment.

The slider 350 (consisting of the slide portion 351 and screw hold portion 356) is formed of synthetic resin such as nylon, ABS or the like in an integral body, while the two portions 351 and 356 of the slider 350 are oscillatable with respect to each other about the thin hinge 355 which connects them to each other. Between the opposing side walls 353a, 353b and 353c of the slide portion 351, there is formed a circular hole 352 which has an inside diameter slightly larger than the outside diameter of the aiming screw male screw portion $320a_2$ and thus the aiming screw male screw portion $320a_2$ can be guided into the circular hole 352 from the opening side (lower side) of the slide portion 351 which is formed slightly narrower than the inside diameter of the circular hole 352. That is, in order to provide a space for assembling the slider 350 to the male screw portion $320a_2$1 there is formed a cutaway portion 360d in the side edge portion 360c of the guide element 360 on the projecting end side thereof and, as shown in FIG. 20, the slider 350 can be assembled to the male screw portion $320a_2$ at the position of the cutaway portion 360d from above the male screw portion $320a_2$.

In the side wall 353a of the slide portion 351 on the guide element 360 side thereof, there are provided a pair of upper and lower horizontal guides 354 and 358 respectively serving as engaging portions each having a U-shaped section, which guides 354 and 358 can be engaged with the side edge portion 360c of the guide element 360 in the vertical direction to thereby prevent the slider 350 (more particularly, the slide portion 351 thereof) against rotation. Due to this, while the horizontal guides 354 and 358 are in engagement with the side edge portion 360c, the slider 350 (the slide portion 351 thereof) can be slided along the guide element 360 while it is loosely fitted with the male screw portion $320a_2$.

On the other hand, the screw hold portion 356 is formed in a shape which can be just fitted into the cutaway portion 351a of the slide portion 351 and includes a female screw portion 356a at the position thereof that is opposed to the circular hole 352 of the side wall 353a. Also, the screw hold portion 356 includes in the lower end portion thereof an elastic hook 357 which is engageable with an engaging recessed portion 353d formed in the lower end portion of the side wall 353a of the slide portion 351. If the elastic hook 357 is engaged with the engaging recessed portion 353d, then the screw hold portion 356 is secured in such a manner that it holds the male screw portion $320a_2$ and the female screw portion 356a of the screw hold portion 356 is held in threaded engagement with the male screw portion $320a_2$. That is, in a state in which the elastic hook 357 is engaged with the engaging recessed portion 353d and thus the screw hold portion 356 holds the male screw portion $320a_2$ (that is, while the female screw portion 356a is in threaded engagement with the male screw portion $320a_2$), and in a state in which the horizontal guides 354 and 358 are engaged with the side edge portion 360c of the guide element 360 and the slide portion 351 is thereby prevented against rotation, the slider 350 (the slide portion 351 thereof) can be slided back and forth along the guide member 360 by an amount proportional to the amount of rotation of the aiming screw 320 in linking with the rotation of the aiming screw 320.

The above-mentioned lower horizontal guide 358 consists of a plate-spring-shaped elastic engaging piece which is formed smaller in width and thickness than the upper horizontal guide 354. In a state in which the male screw portion $320a_2$ is loosely fitted with the circular hole 352 of the slide portion 351, the upper horizontal guide 354 and lower horizontal guide (elastic engaging piece) 358 hold the side edge portion 360a of the guide element 360 between them in the vertical direction. Further, in the leading end portion of the lower horizontal guide (elastic engaging piece) 358, there is formed an expansion portion 358a which is engageable with a cutaway portion 362 formed in the side edge portion 360c of the guide element 360 and, when the leading end expansion portion 358a is in engagement with the cutaway portion 362, the cursor 374 is situated at the scale zero point 363a. For this reason, if the leading end expansion portion 358a is engaged with the cutaway portion 362, then the slider 350 (the slide portion 351 thereof) can be secured provisionally at a given position, that is, at the scale zero point position. And, reference character 359 stands for a knob which is so formed as to project forwardly of the lower end of the screw hold portion 356 and is used to operate the screw hole portion 356.

Figure 18:
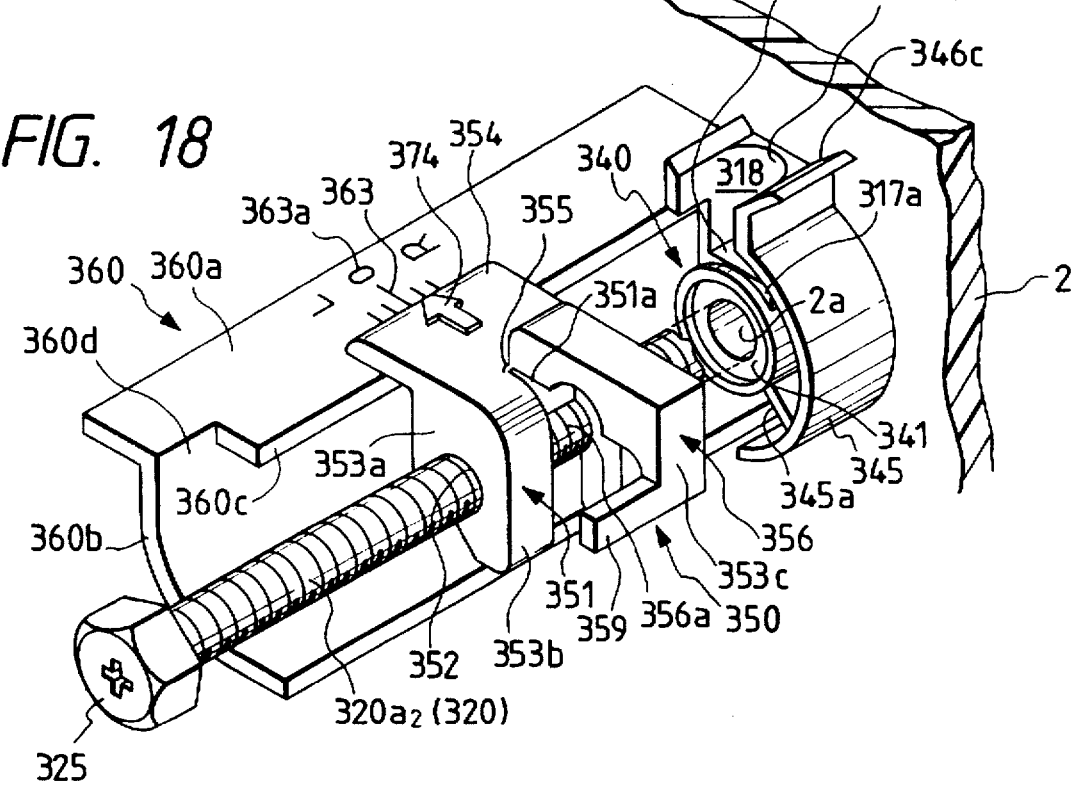
FIG. 18 is a perspective view of the neighborhood of the aiming screw bearing portion in the above headlamp shown in FIG. 16.
Figure 19:
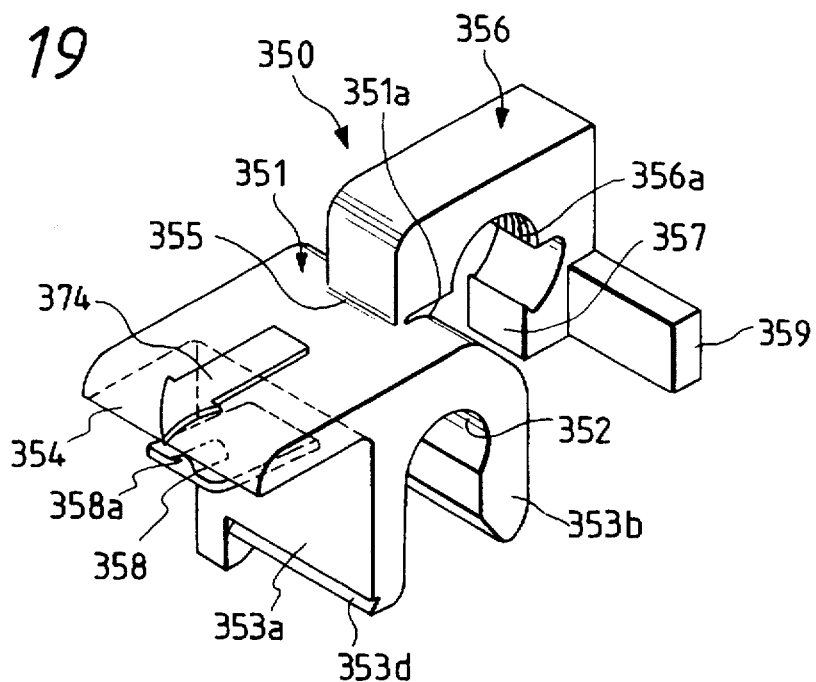
FIG. 19 is a perspective view of a nut element which is one of main components of the inclination measuring device of the fifth embodiment.
Figure 21:
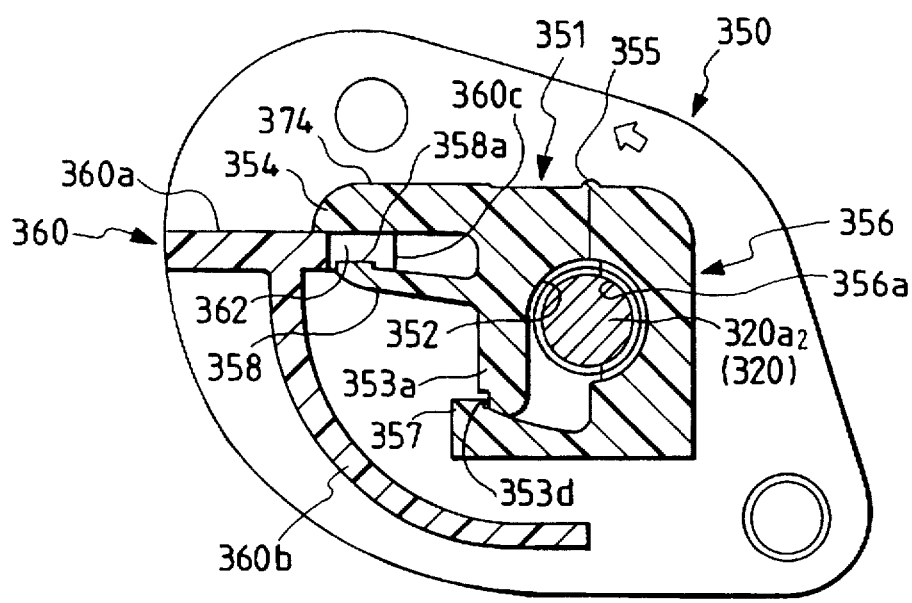
FIG. 21 is a sectional view of the inclination measuring device.

In the thin hinge 355, there exists an initial stress which acts in a direction to cause the screw hold portion to jump up. That is, when the slider 350 (consisting of the slide portion 351 and screw hole portion 356) is formed in an integral body, as shown in FIG. 19, the thin hinge 355 extends straight and the screw hold portion 356 is jumped up by the hinge 355. On the other hand, as shown in FIG. 21, when the elastic hook 357 is in engagement with the engaging recessed portion 353d, there exists in the folded thin hinge 355 a stress which is going to restore the thin hinge to its initial state. Therefore, if the elastic hook 357 is disengaged from the engaging recessed portion 353d, then the screw hold portion 356 is naturally oscillated about the thin hinge 355 due to the restitutive force of the thin hinge 355 and is thus turned into such jumped-up state as shown in FIG. 18. Accordingly, if the engagement between the elastic hook 357 and engaging recessed portion 353d is removed by pinching the knob 359 with fingers or by using an aiming screw rotational operation jig such as a driver or the like, then the threaded engagement between the screw hold portion 356 and male screw portion $320a_2$ can be removed simply (that is, the linkage between the slide portion 351 and aiming screw 320 can be removed simply).

Also, the aiming adjustment and the scale zero point adjustment in the inclination measuring device (slider 350) can be made in the following manner.

From a state as shown in FIGS. 17 and 20 in which the screw hold portion 356 is in threaded engagement with the male screw portion $320a_2$, the upper and lower horizontal guides 354 and 358 are in engagement with the side edge portion 360c of the guide element 360, the slide portion 351 is prevented against rotation by the guide element 360, and the slide portion 351 is linked with the aiming screw 320, at first, as shown in FIG. 18, the screw hold portion 356 is made to jump up to thereby remove the linkage between the slider 350 (slide portion 351) and the aiming screw male screw portion $320a_2$.

Next, if the slider 350 (slide portion 351 and screw hold portion 356) is slided along the guide element 360 to thereby bring the leading end expansion portion 358a of the lower horizontal guide (elastic engaging piece) 358 into engagement with the cutaway portion 362, then the cursor 374 is naturally situated at the scale zero point 363a position. That is, the scale zero adjustment can be achieved.

Next, if the aiming screw 320 is rotatively operated, then the aiming adjustment can be made. In this state, since the slider 350 (slide portion 351) is not linked with the aiming screw 320, even if the aiming screw 320 is rotated, the slider 350 (slide portion 351) is little influenced by the rotation of the aiming screw 320. Also, since the leading end expansion portion 358a of the lower horizontal guide (elastic engaging piece) 358 serving as uneven elastic securing means is in engagement with the cutaway portion 362, the slider 350 (slide portion 351) is energized and held at the scale zero point position (the position where the cursor 374 points out the zero point 363a). Therefore, the aiming adjustment can be made without upsetting the scale zero point adjustment.

After completion of the aiming adjustment, if the screw hold portion 356 is oscillated about the thin hinge 355 to thereby bring the elastic hook 357 into engagement with the engaging recessed portion 353d, then the screw hold portion 356 is allowed to hold the male screw portion $320a_2$ (that is, the female screw portion 356a and male screw portion $320a_2$ are in threaded engagement with each other), so that the rotation of the aiming screw 320 is linked with the slide operation (sliding motion) of the slider 350 (slide portion 351), (that is, the shifting of the illumination angle of the headlamp can be detected). In this state in which the slider 350 (slide portion 351) is linked with the aiming screw 320, if the aiming screw 320 is rotated, then the slider 350 (slide portion 351) is able to slide against the engagement retaining force produced by the uneven elastic securing means (the engagement between the cutaway portion 362 and the leading end expansion portion 358a of the elastic engaging piece 358 consisting of the upper horizontal guide), so that the inclination measuring device can display properly the shifting of the illumination angle of the headlamp in the right and left direction. In other words, if the reflector is inclined due to vibrations or the like, then the aiming screw 320 is rotated with respect to the screw support nut 321 in response to the inclining motion of the reflector 4, the screw hold portion 356 is advanced or retreated along the male screw portion $320a_2$ as the aiming screw 320 is rotated, that is, the slider 350 (slide portion 351) is slided along the guide element 360 accurately by an amount corresponding to the amount of inclination of the reflector 4, and this sliding motion of the slider 350 appears as the shifting of the scale (the scale that is pointed out by the cursor 374).

For example, if the front end side male screw portion $320a_1$ of the aiming screw 320 is a single-threaded left hand screw, the rear end side male screw portion $320a_2$ is a single- or double-threaded right hand screw, and the optical axis L is inclined left when viewed from a driver, then the aiming screw 320 is rotated clockwise when viewed from the driver and the nut 321 is thereby moved forwardly. In this state, the cursor 374 of the inclination measuring device (slider 350) shows a scale which is shifted to the "L" display side from the scale zero point 363a on the guide element 360, and this scale is equivalent to an amount of inclination of the optical axis L to the left side.

Also, to assemble the slider 350 to the aiming screw 320, as shown in FIG. 20, at the cutaway portion 360d position of the guide element 360 on the projecting end side thereof, the slider 350 (slide portion 351) may be assembled to (may be loosely fitted with) the aiming screw 320 from above the aiming screw male screw portion $320a_2$. That is, the screw hold portion 356 is turned into its jump-up state to thereby lower the opening side of the slider 350 (slide portion 351), the aiming screw male screw portion $320a_2$ is guide into the circular hole 352, and the circular hole 352 is engaged (loosely fitted) with the male screw portion $320a_2$. After then, the side edge portion 360c of the guide element 360 is positioned between the upper and lower horizontal guides 354 and 358, and, as shown by an outline arrow in FIG. 20, the slider 350 (slide portion 351) is pushed in along the guide element 360, so that the side edge portion 360c is engaged between the upper and lower horizontal guides 354 and 358. Further, if the slider 350 (slide portion 351) is slided along the guide element 360 to bring the leading end expansion portion 58a of the elastic engaging piece 358 consisting of the lower horizontal guide into engagement with the cutaway portion 362 of the guide element 360, then the slider 350 is naturally held at a zero point adjusted position.

Now, in FIG. 16, reference character 70 stands for an air bubble type of inclination measuring device which is used to measure the inclination of the reflector 4 in the vertical direction thereof, that is, the inclination of the illumination angle of the headlamp in the vertical direction thereof. The measuring device 70 includes a container-shaped casing 71 which is mounted on the upper surface wall of the reflector 4 and is opened upwardly, a cover body 72 which is supported by the casing 71 in such a manner that it can be oscillated with respect to the horizontal axis Lx, and a linear air bubble pipe 74 which is suspended from and supported by the cover body 72 and is stored within the casing 71. And, reference character 76 designates an adjusting screw which is used to adjust the zero point of the air bubble pipe 74.

Figure 22:
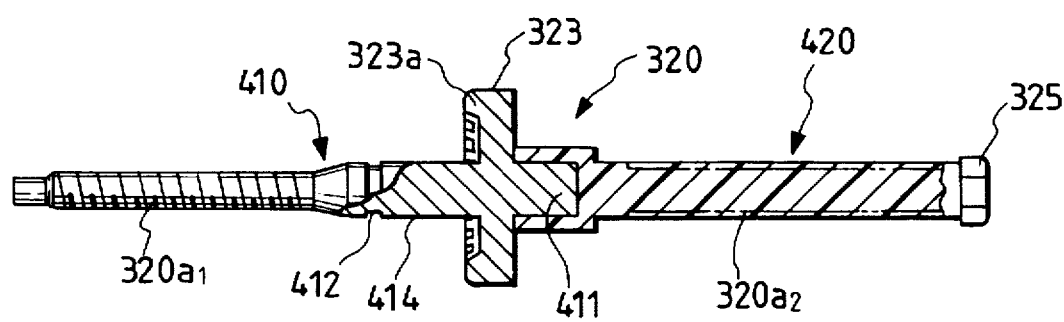
FIG. 22 is a side sectional view showing the aiming screw according to the fifth embodiment of the invention.

Also, the aiming screw 320, as shown in an enlarged manner in FIG. 22, includes a metal aiming screw main body 410 including a male screw portion $320a_1$ with which the screw support nut 321 on the reflector 4 side is threadedly engageable, a crown gear 323 consisting of a right angle change gear which is formed integrally with the rear end portion of the aiming screw main body 410, and an extension portion 420 which is formed of synthetic resin and is similarly formed integrally with the rear end portion of the aiming screw main body 410, while the extension portion 420 includes a male screw portion $320a_2$ to which the slider 350 can be assembled, and a jig engaging portion 325 with which a driver or the like is engageable. As a method of forming the aiming screw main body 410 and crown gear 323 in an integral body, there is known a method in which they are made of a metal rod blank by a burring machining operation or the like.

Also, the rear end portion of the aiming screw main body 410 is projected in a rectangular block from the position of the main body 410 where the crown gear 323 is formed to thereby provide a rectangular projecting portion 411, and the extension portion 420 formed of synthetic resin is united together with the rectangular projecting portion 411. That is, the aiming screw main body 410 formed integral with the crown gear 323 and the extension portion 420 including the male screw portion $320a_2$ are united together into an integral body by an insert forming operation.

Now, reference character 412 designates a groove to which the push-on fixture 8 can be secured, and 414 stands for a straight portion which is inserted into and supported by the extend-through portion of the lamp body 2.

Figure 23:
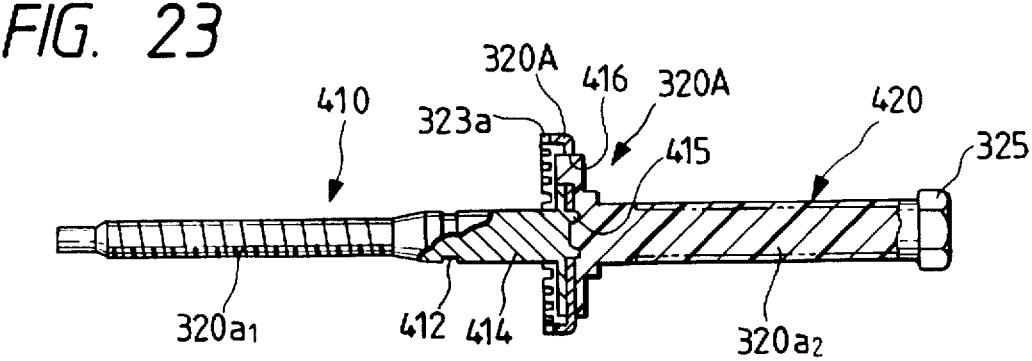
FIG. 23 is a side sectional view showing the aiming screw according to the sixth embodiment of the invention.

Next, FIG. 23 shows a sixth embodiment of an aiming screw according to the invention, that is, FIG. 23 is a partially sectional side view of the aiming screw according to the sixth embodiment of the invention.

In the aiming screw 320A according to the sixth embodiment, a crown gear 323A formed of thin plate metal is staked and fixed to the rear end portion of an aiming screw main body 410 formed of metal and, at the same time, an extension portion 420 formed of synthetic resin and including a male screw portion $320a_2$ is formed integral with the aiming screw main body 410 rear end portion. That is, the aiming screw main body 410 with the crown gear 323A staked and fixed thereto and the extension portion 420 are united together into an integral body by an insert forming operation. Reference character 415 designates the staked portion. Also, in the disk portion of the crown gear 323A, there are formed a plurality of openings 416 extending in the peripheral direction of the disk portion, and resin material on the extension portion 420 side is disposed up to the opposite side to the disk portion, thereby enhancing the connection strength between the aiming screw main body 410 and extension portion 420.

Figure 24:
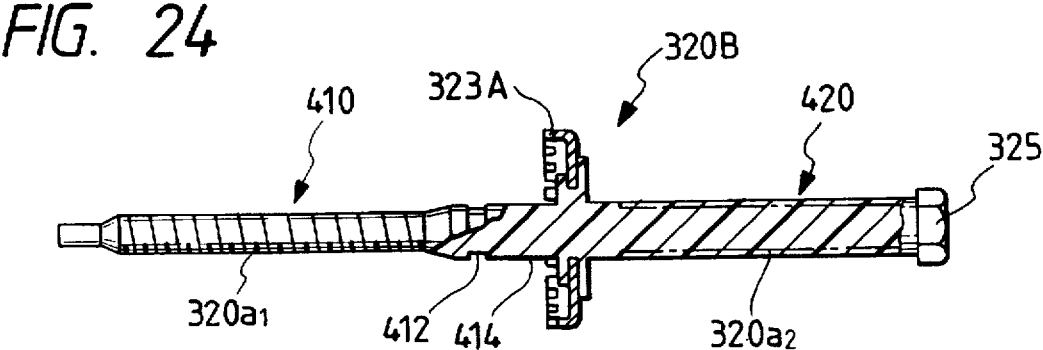
FIG. 24 is a side sectional view showing the aiming screw according to the seventh embodiment of the invention.

Now, FIG. 24 shows a seventh embodiment of an aiming screw according to the invention, that is, FIG. 24 is a partially sectional side view of the aiming screw according to the seventh embodiment of the invention.

In the aiming screw 320B according to the seventh embodiment, an aiming screw main body 410 and an extension portion 420 are formed of synthetic resin integrally with each other, while only the crown gear 323A is formed of metal. That is, when the aiming screw main body 410 and extension portion 420 are formed of synthetic resin integrally with each other, the crown gear 323A is inserted and formed between the aiming screw main body 410 and extension portion 420.

Figure 25:
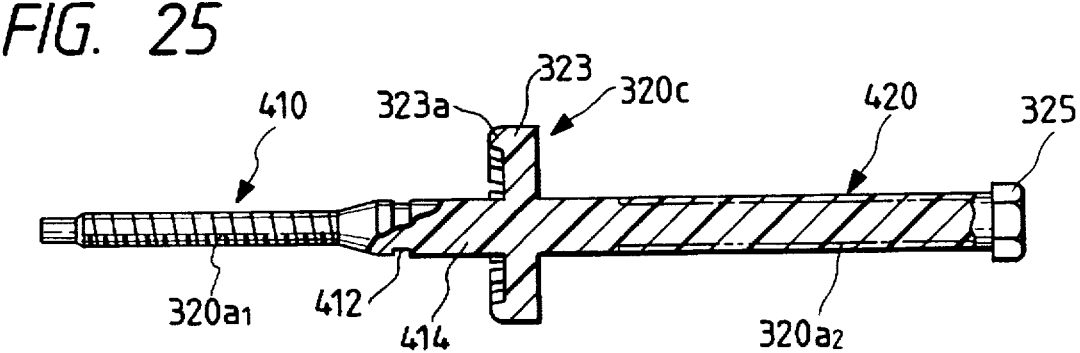
FIG. 25 is a side sectional view showing the aiming screw according to the eighth embodiment of the invention.
Figure 26:
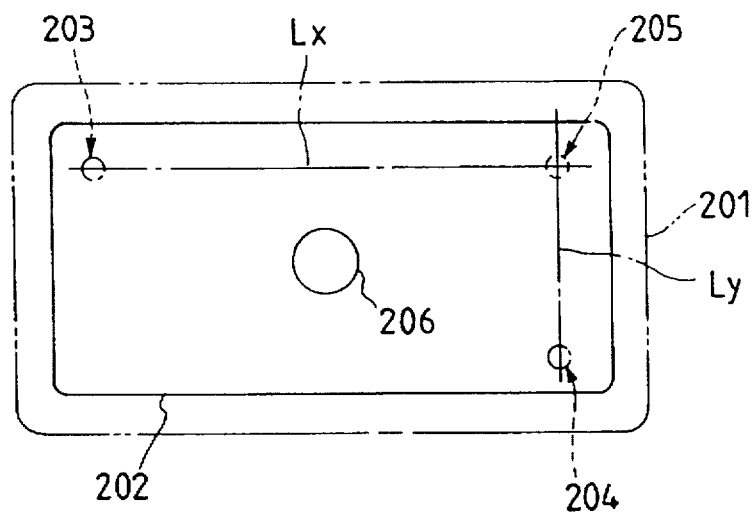
FIG. 26 is a front view of a conventional headlamp.
Figure 27:
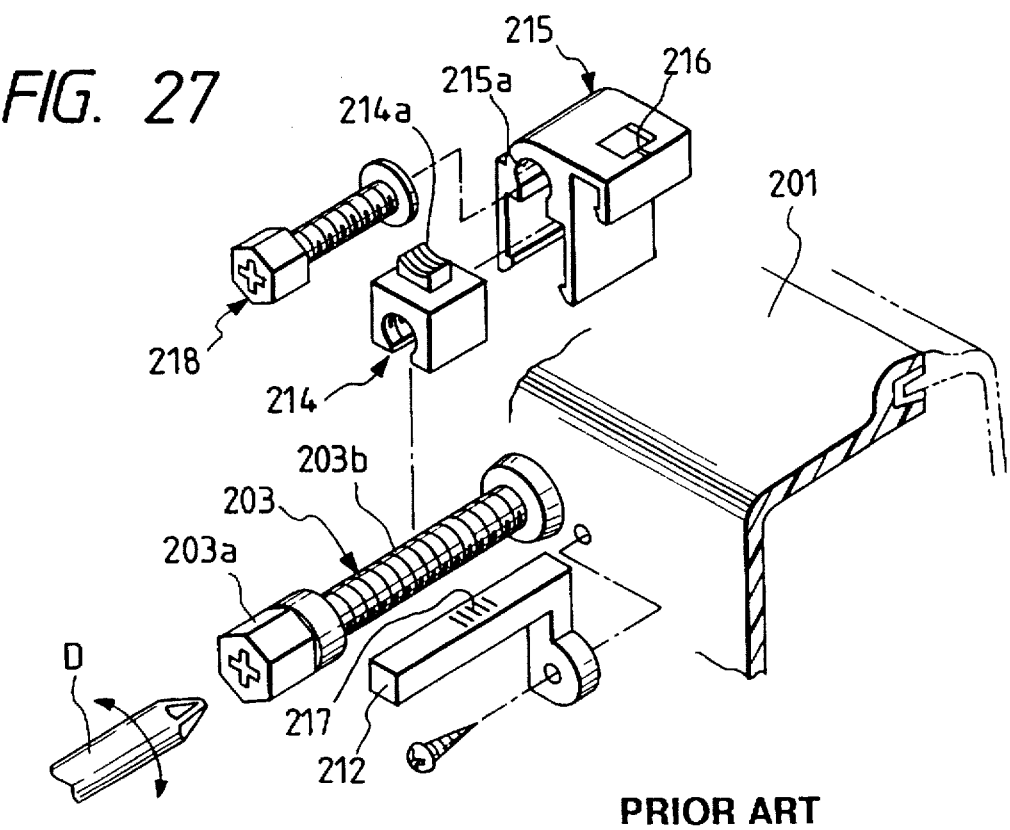
FIG. 27 is a perspective view of a first conventional inclination measuring device.
Figure 28:
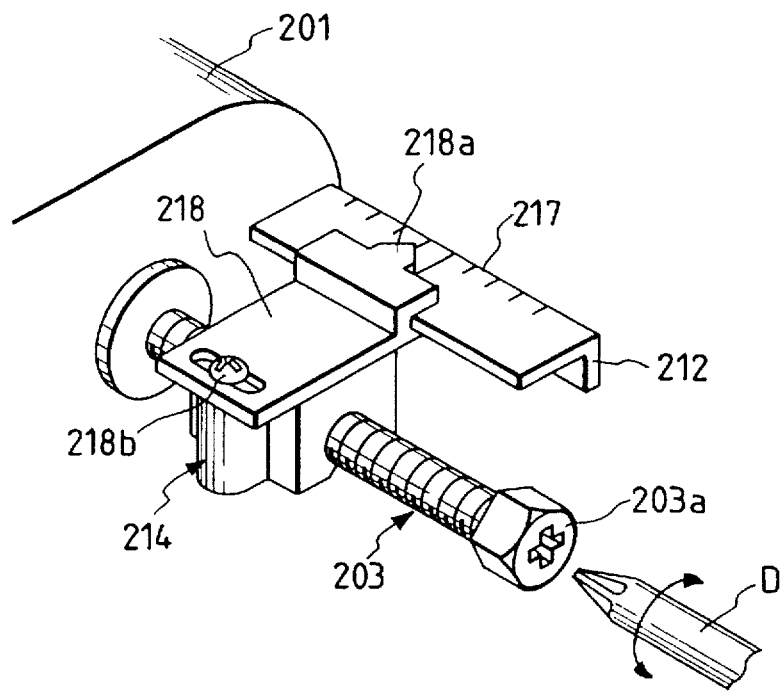
FIG. 28 is a perspective view of a second conventional inclination measuring device; and, FIG. 29 is a longitudinal section view of the second conventional inclination measuring device.
Figure 29:
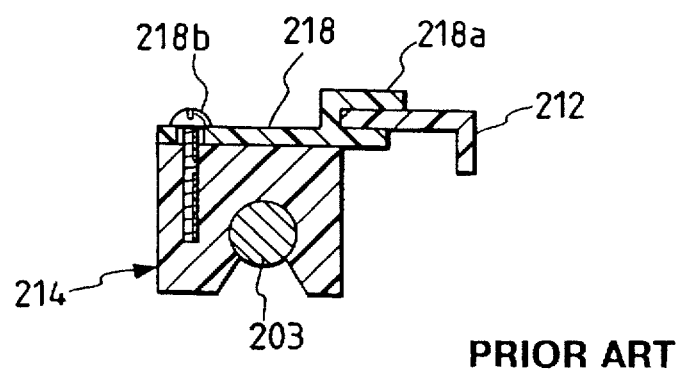

Next, FIG. 25 shows a eighth embodiment of an aiming screw according to the invention, that is, FIG. 25 is a partially sectional side view of the aiming screw according to the eighth embodiment of the invention.

In the aiming screw 320C according to the eighth embodiment, an aiming screw main body 410, a crown gear 323 and an extension portion 420 are all formed of synthetic resin. That is, they are united together into an integral body by means of integral formation of synthetic resin.

In the above-mentioned various embodiments of the invention, description has been given of the invention by means of the headlamp of a movable reflector type in which the lamp body acts as the reference element and the reflector acts as the inclinable body. However, it is also clear that the present invention can be applied similarly to a headlamp of a movable unit type including a lamp body/reflector unit in which a lamp housing serves as a reference element and the lamp body and reflector are united together to form an inclinable element.

As can be seen clearly from the foregoing description, according to the headlamp for use in a vehicle constructed in accordance with the present invention, since the aiming screw can be rotatively operated by use of a driver inserted from one of the side portions of the headlamp, for example from above the headlamp, an operator need not be forced to take an unnatural attitude as in the conventional headlamp and thus the operator is able to adjusted the right and left illumination angle of the headlamp smoothly.

Also, due to the fact that the driver can be rotatively operated without taking the unnatural attitude, the tip edge of the driver is hard to move apart from the aiming screw side engaging portion, which eliminates the inconvenience as in the conventional headlamp that the tip edge of the driver can be moved out of position to break or damage the components of the inclination measuring device.

Further, as the crown gear, which is provided at the root position of the backwardly projecting portion of the aiming screw, is rotatively operation by use of the driver, there can be minimized the load which acts on the aiming screw bearing portion during the rotative operation of the driver and thus the durability of the aiming screw bearing portion can also be improved.

And, according to the invention as set forth in claim 2, since the inclination measuring device is structured such that the nut element slides along the male screw portion of the driven shaft disposed in a direction at right angles to the aiming screw, the amount of projection of the headlamp projecting backwardly of the reference element is small and thus the longitudinal dimensions of the headlamp are also reduced, which improves greatly the freedom of mounting the headlamp onto a vehicle body.

What is claimed is:

1. A headlamp of a movable inclinable element type for use in a vehicle, in which an inclinable element having a light reflecting surface for setting an irradiation direction of a lamp is supported inclinably with respect to a reference element, and an aiming screw extending through and forwardly of the reference element and borne rotatably in an extend-through portion thereof is rotatively operated to incline the inclinable element right and left with respect to the reference element by an angle corresponding to an amount of rotation of the aiming screw, thereby being able to adjust the right and left illumination angles of the headlamp, characterized in that said aiming screw includes a male screw portion extending backwardly of said reference element; said reference element includes a guide element extending in parallel to said male screw portion of said aiming screw; and, between said male screw portion and guide element, there is interposed an inclination measuring device comprising a nut element not only threadedly engageable with said male screw portion and contactable with said guide element in a rotation preventive manner but also advanceable and retreatable along said guide element in linking with the rotational movement of said aiming screw, and a relative scale formed between said nut element and said guide element, for measuring the right and left inclination of said inclinable element; and, at a root position of said male screw portion of said aiming screw, there is formed a crown gear engageable with a tip edge of a removable driver inserted from a direction at right angles to the extending direction of said aiming screw and a driver support structure is formed on said headlamp and around said crown gear to provide a guide for inserting said removable driver into engagement with teeth of said crown gear.

2. The headlamp of a moveable inclinable element type of claim 1 wherein an O-ring seals an opening where said aiming screw extends through said reference element.

3. The headlamp of a moveable inclinable element type of claim 2 wherein said O-ring is held in place between said crown gear and a cylindrical driver support portion formed on said reference element.

4. The headlamp of a moveable inclinable element type of claim 2 wherein said O-ring is fitted into a flat annular recessed portion on said crown gear.

5. The headlamp of a moveable inclinable element type of claim 1 wherein said crown gear comprises a flat annular recessed portion and an outer peripheral edge portion having teeth and wherein an O-ring is fitted into said flat annular recessed portion of said crown gear such that said O-ring is compressed against said driver support structure.

6. The headlamp of a moveable inclinable element type of claim 1 wherein said driver support structure is also formed with a wall to prevent the entry of external objects which could become entangled with said teeth of said crown gear.

7. The headlamp of a moveable inclinable element type of claim 1 wherein said crown gear is formed integral with said aiming screw.

8. The headlamp of a moveable inclinable element type of claim 1 wherein said crown gear is formed of a synthetic resin and inserted into said aiming screw.

9. The headlamp of a moveable inclinable element type of claim 1 wherein said aiming screw, said male screw portion of said aiming screw, and said crown gear are formed of synthetic resin.

10. The headlamp of a moveable inclinable element type of claim 1 wherein said crown gear and said aiming screw are each formed of metal, said crown gear being fixed to an end portion of said aiming screw, and said male screw portion is formed of a synthetic resin and said male screw portion, said crown gear, and said aiming screw are united by an insert forming operation.

11. A headlamp of a movable inclinable element type for use in a vehicle, in which an inclinable element having a light reflecting surface for setting an irradiation direction of a lamp is supported inclinably with respect to a reference element, and an aiming screw extending through and forwardly of the reference element and borne rotatably in an extend-through portion thereof is rotatively operated to incline the inclinable element right and left with respect to the reference element by an angle corresponding to an amount of rotation of the aiming screw, thereby being able to adjust the right and left illumination angles of the headlamp, characterized in that in said reference element, there are provided a driven shaft including a male screw portion and rotatable in such a manner that said driven shaft extends from a position of said reference element adjacent to a projecting portion of said aiming screw extending backwardly of said reference element along said reference element in a direction at substantially right angles to an extending direction of said aiming screw, and a guide element extending in parallel to said male screw portion of said driven shaft; between the projecting portion of said aiming screw extending backwardly of said reference element and said driven shaft, there is interposed a right angle change gear mechanism for rotating said driven gear and said aiming screw in linking with each other; said male screw portion of said driven shaft and said guide element, there is provided an inclination measuring device comprising a nut element not only threadedly engageable with said male screw portion and contactable with said guide element in a rotation preventive manner but also advanceable and retreatable along said guide element in linking with the rotational movement of said aiming screw, and a relative screw formed between said nut element and said guide element, for measuring the right and left inclination of said inclinable element; and, at a root position of said projecting portion of said aiming screw extending backwardly of said reference element, there is formed a crown gear engageable with a tip edge of a driver inserted from a direction extending at right angles to the extending direction of said aiming screw.

12. The headlamp of a moveable inclinable element type of claim 11 wherein an O-ring seals an opening where said aiming screw extends through said reference element.

13. The headlamp of a moveable inclinable element type of claim 12 wherein said O-ring is held in place between said crown gear and a cylindrical driver support portion formed on said reference element.

* * * * *